United States Patent
Endo et al.

(10) Patent No.: US 9,893,534 B2
(45) Date of Patent: Feb. 13, 2018

(54) RELAY DEVICE OF WIRELESS POWER TRANSMISSION SYSTEM

(71) Applicant: ADVANTEST CORPORATION, Tokyo (JP)

(72) Inventors: Yuki Endo, Tokyo (JP); Yasuo Furukawa, Tokyo (JP)

(73) Assignee: ADVANTEST CORPORATION, Tokyo (JP)

( * ) Notice: Subject to any disclaimer, the term of this patent is extended or adjusted under 35 U.S.C. 154(b) by 986 days.

(21) Appl. No.: 14/095,434

(22) Filed: Dec. 3, 2013

(65) Prior Publication Data

US 2014/0152119 A1    Jun. 5, 2014

(30) Foreign Application Priority Data

Dec. 4, 2012   (JP) .................. 2012-265655

(51) Int. Cl.
*H02J 5/00*     (2016.01)
*H02J 50/50*    (2016.01)

(52) U.S. Cl.
CPC ........... *H02J 5/005* (2013.01); *Y10T 307/747* (2015.04)

(58) Field of Classification Search
CPC ...................... H02J 5/005; Y10T 307/747
See application file for complete search history.

(56) References Cited

U.S. PATENT DOCUMENTS

| 2007/0109708 A1* | 5/2007 | Hussman | H02J 1/00 361/113 |
| 2008/0116846 A1* | 5/2008 | Greenfeld | H02J 7/025 320/108 |
| 2009/0146892 A1* | 6/2009 | Shimizu | G06K 19/0726 343/745 |
| 2011/0133569 A1* | 6/2011 | Cheon | H02J 17/00 307/104 |
| 2012/0075148 A1* | 3/2012 | Cho | G06K 19/0723 343/702 |

(Continued)

FOREIGN PATENT DOCUMENTS

| JP | 2007-501600 | 1/2007 |
| JP | 2011-514781 | 5/2011 |
| JP | 2011-160634 | 8/2011 |

(Continued)

OTHER PUBLICATIONS

Office action dated Dec. 2, 2014 from corresponding Japanese Patent Application No. 2012-265655 and its English translation from the applicants.

(Continued)

*Primary Examiner* — Jared Fureman
*Assistant Examiner* — James Evans
(74) *Attorney, Agent, or Firm* — Cantor Colburn LLP

(57) ABSTRACT

A relay antenna includes a power relay coil. An automatic tuning assist circuit is coupled with the relay antenna. The automatic tuning assist circuit has first and second terminals coupled with the relay antenna. Multiple switches are arranged together with N (N represents an integer) auxiliary capacitors between the first terminal and the second terminal. A controller is configured to switch on and off each of the multiple switches in synchronization with an electric power signal transmitted from a wireless power supply apparatus.

10 Claims, 22 Drawing Sheets

(56) References Cited

U.S. PATENT DOCUMENTS

2012/0235502 A1* 9/2012 Kesler ............... H03H 7/40
307/104
2015/0207333 A1* 7/2015 Baarman ............. H02J 17/00
307/104

FOREIGN PATENT DOCUMENTS

WO      2004/105208     12/2004
WO      2009/111597      9/2009

OTHER PUBLICATIONS

A Karalis, J.D. Joannopoulos, M. Soljacic, "Efficient wireless non-radiative mid-range energy transfer" Annals of Physics vol. 323, Jan. 2008, pp. 34-48.

* cited by examiner

PRIOR ART

6a

6c

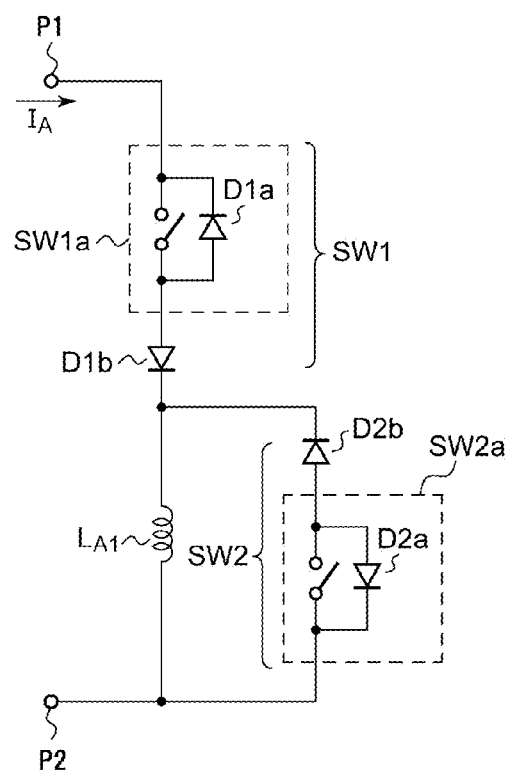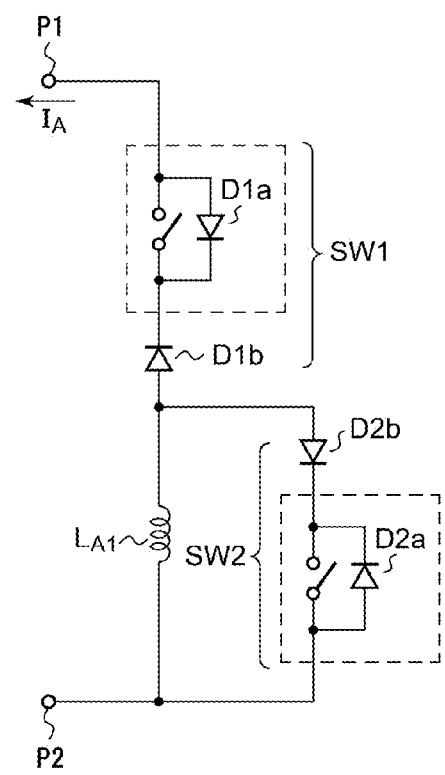
FIG.16A
FIG.16B
200a
200b

200d

RELAY DEVICE OF WIRELESS POWER TRANSMISSION SYSTEM

CROSS-REFERENCE TO RELATED APPLICATIONS

This application claims priority to Japanese Patent Application No. 2012-265655 filed on Dec. 4, 2012, the disclosure of which is hereby incorporated by reference in its entirety.

BACKGROUND OF THE INVENTION

1. Field of the Invention

The present invention relates to a wireless power supply technique.

2. Description of the Related Art

In recent years, wireless (contactless) power transmission has been receiving attention as a power supply technique for electronic devices such as cellular phone terminals, laptop computers, etc., or for electric vehicles. Wireless power transmission can be classified into three principal methods using an electromagnetic induction, an electromagnetic wave reception, and an electric field/magnetic field resonance.

The electromagnetic induction method is employed to supply electric power at a short range (several cm or less), which enables electric power of several hundred watts to be transmitted in a band that is equal to or lower than several hundred kHz. The power use efficiency thereof is on the order of 60% to 98%. In a case in which electric power is to be supplied over a relatively long range of several meters or more, the electromagnetic wave reception method is employed. The electromagnetic wave reception method allows electric power of several watts or less to be transmitted in a band between medium waves and microwaves. However, the power use efficiency thereof is small. The electric field/magnetic field resonance method has been receiving attention as a method for supplying electric power with relatively high efficiency at a middle range on the order of several meters (A. Karalis, J. D. Joannopoulos, M. Soljacic, "Efficient wireless non-radiative mid-range energy transfer" ANNALS of PHYSICS Vol. 323, January 2008, pp. 34-48)

FIG. 1 is a diagram showing a wireless power transmission system according to a comparison technique. The wireless power transmission system 1r includes a wireless power supply apparatus 2r and a wireless power receiving apparatus 4r. The wireless power supply apparatus 2r includes a transmission coil $L_{TX}$, a resonance capacitor $C_{TX}$, and an AC power supply 10r. The wireless power receiving apparatus 4r includes a reception coil $L_{RX}$, a resonance capacitor $C_{RX}$, and a load 70.

With such a wireless power transmission system 1r, in order to provide high-efficiency electric power transmission, there is a need to satisfy the conditions for resonance in the entire system including the wireless power supply apparatus 2r and the wireless power receiving apparatus 4r. With such a system, the wireless power receiving apparatus 4r moves over time. Thus, the degree of coupling between the antennas changes with time. As a result, the conditions for resonance change with time.

In order to provide a supply of electric power over a wide range, an arrangement has been proposed in which a relay device including a resonance circuit is arranged between a power supply apparatus and a power receiving apparatus. In a case in which such a relay device is arranged, this leads to complicated conditions for resonance in the entire system. In order to satisfy such conditions for resonance which change over time, there is a need to provide a variable capacitor to each of the wireless power supply apparatus 2r, the wireless power receiving apparatus 4r, or the relay device, and there is a need to adjust the capacitance of each variable capacitor thus provided so as to satisfy the conditions for resonance. However, in actuality, it is very difficult to detect or estimate the capacitance of each variable capacitor so as to satisfy the conditions for resonance.

In particular, in a case in which multiple relay devices are provided, when the user changes the capacitance of a given variable capacitor, the conditions for resonance also change due to the interaction between the wireless power supply apparatus 2r, the wireless power receiving apparatus 4r, and the multiple relay devices. Thus, in actuality, it is almost impossible to obtain the optimum value of the capacitance to be set for each variable capacitor.

Furthermore, in a case of transmitting a large amount of electric power, the voltage that develops at the resonance circuit has a great amplitude. Thus, the kinds of elements which can be employed as such a variable capacitor are extremely limited from the viewpoint of the breakdown voltage.

SUMMARY OF THE INVENTION

The present invention has been made in order to solve such a problem. Accordingly, it is an exemplary purpose of an embodiment of the present invention to provide a relay device which can be employed in a wireless power supply system.

An embodiment of the present invention relates to a relay device employed in a resonance wireless power transmission system. The relay device comprises: a relay antenna comprising a power relay coil; and an automatic tuning assist circuit coupled with the relay antenna. The automatic tuning assist circuit comprises: a first terminal and a second terminal coupled with the relay antenna; N (N represents an integer) auxiliary capacitors; multiple switches each of which is arranged between two terminals from among the first terminal, the second terminal, and the terminals of the aforementioned N auxiliary capacitors; and a controller configured to switch on and off the multiple switches in synchronization with an electric power signal transmitted from a wireless power supply apparatus.

In a case in which the frequency of the electric power signal received from the wireless power supply apparatus does not match the resonance frequency of the resonance circuit including the relay antenna, the resonance circuit functions as a capacitor circuit or otherwise functions as an inductor circuit. In this case, the resonance current that flows through the resonance circuit has a phase that is delayed or otherwise advanced as compared with the resonance voltage that develops at the resonance circuit. In this state, in a case in which the multiple switches are switched on and off in synchronization with the electric power signal, the N auxiliary capacitors are charged or otherwise discharged using a resonance current. Accordingly, the correction voltage that develops at the auxiliary capacitors is applied to the relay antenna. Thus, such an arrangement is capable of controlling the phase of the current that flows through the relay antenna according to the switching phases of the multiple switches.

Also, the controller may be configured to switch on and off the multiple switches with the same frequency as that of the electric power signal transmitted from the wireless power supply apparatus, or otherwise with a frequency obtained by multiplying or otherwise dividing the frequency of the electric power signal by an odd number.

Also, the multiple switches may include a first switch and a second switch. Also, the N auxiliary capacitors may include a first auxiliary capacitor. Also, the first switch and the first auxiliary capacitor may be arranged in series between the first terminal and the second terminal. Also, the second switch may be arranged between the first terminal and the second terminal, in parallel with the first switch and the first auxiliary capacitor.

With such an arrangement, the first capacitor is charged or otherwise discharged so as to provide phase matching between the resonance current and the resonance voltage. Thus, such an arrangement provides a quasi-resonant state.

Also, the N auxiliary capacitors may further include a second auxiliary capacitor. Also, the second auxiliary capacitor may be arranged between the first terminal and the second terminal, in series with the second switch.

With such an arrangement, the second auxiliary capacitor is charged or otherwise discharged so as to provide phase matching between the resonance current and the resonance voltage, in addition to charging or otherwise discharging the first auxiliary capacitor. Thus, such an arrangement provides a quasi-resonant state.

Also, the first switch and the second switch may each be configured as a uni-directional switch. Also, the controller may be configured to switch on and off the first switch and the second switch with a phase such that no current flows through their inversely conducting elements.

Also, the first switch and the second switch may each be configured as a bi-directional switch.

Such an arrangement is capable of relaxing the phase constraints on the switching operation.

Also, the multiple switches may include a first switch, a second switch, a third switch, and a fourth switch. Also, the N auxiliary capacitors include a first auxiliary capacitor. Also, the first switch and the second switch may be arranged in series between the first terminal and the second terminal. Also, the third switch and the fourth switch may be sequentially arranged in series between the first terminal and the second terminal, forming a path in parallel with the first switch and the second switch. Also, the first auxiliary capacitor may be arranged between a connection node that connects the first switch and the second switch and a connection node that connects the third switch and the fourth switch.

Also, the first switch through the fourth switch may each be configured as a uni-directional switch. Also, the controller may be configured to switch on and off the first switch through the fourth switch with a phase such that no current flows through their inversely conducting elements.

Also, the first switch through the fourth switch may each be configured as a bi-directional switch. Such an arrangement is capable of relaxing the phase constraints on the switching operation.

Another embodiment of the present invention also relates to a relay device employed in a resonance wireless power transmission system. The relay device comprises: a relay antenna comprising a power relay coil; and an automatic tuning assist circuit coupled with the relay antenna. The automatic tuning assist circuit comprises: N (N represents an integer) auxiliary capacitors; multiple switches arranged in order to charge and discharge the N auxiliary capacitors using a current that flows through the relay antenna; and a controller configured to perform switching of the multiple switches so as to generate a capacitor voltage between respective ends of each of the N auxiliary capacitors, and to apply, to the relay antenna, a correction voltage that corresponds to the capacitor voltages that develop at the N auxiliary capacitors.

In a case in which the frequency of the electric power signal received from the wireless power supply apparatus does not match the resonance frequency of the resonance circuit including the relay antenna, the resonance circuit functions as a capacitor circuit or otherwise functions as an inductor circuit. In this case, the resonance current that flows through the resonance circuit has a phase that is delayed or otherwise advanced as compared with the resonance voltage that develops at the resonance circuit. In this state, in a case in which the multiple switches are switched on and off in synchronization with the electric power signal, the N auxiliary capacitors are charged or otherwise discharged using a resonance current. Accordingly, the correction voltage that develops at the auxiliary capacitors is applied to the relay antenna. Thus, such an arrangement is capable of controlling the phase of the current that flows through the relay antenna according to the switching phases of the multiple switches.

Also, the relay antenna may be coupled in series with the relay antenna via a transformer.

Also, the relay antenna may further comprise a resonance capacitor arranged in series with the power relay coil.

Yet another embodiment of the present invention also relates to a relay device employed in a resonance wireless power transmission system. The relay device comprises: a relay antenna comprising a power relay coil; and an automatic tuning assist circuit coupled with the relay antenna, and configured to inject a correction current into the relay antenna or otherwise to draw a correction current from the relay antenna. The automatic tuning assist circuit comprises: a first terminal and a second terminal coupled with the relay antenna; N (N represents an integer) auxiliary coils; and multiple switches arranged between two terminals from among the first terminal, the second terminal, and the terminals of the N auxiliary coils; and a controller configured to switch on and off the multiple switches in synchronization with an electric power signal transmitted from a wireless power supply apparatus.

In a case in which the resonance frequency of the resonance system including the relay antenna matches the frequency of the electric power signal, the current that flows through the auxiliary coil becomes zero. In this state, the correction current becomes zero. In a case in which the resonance frequency of the relay antenna does not match the frequency of the electric power signal, the resonance circuit including the relay antenna has an impedance that functions as a capacitor impedance or otherwise functions as an inductor impedance. Accordingly, a current is induced in the relay antenna with a phase which is delayed or otherwise advanced as compared with the electric power signal. In this state, in a case in which the switches included in the automatic tuning assist circuit are switched on and off in synchronization with the electric power signal, a current flows through the auxiliary coil. The auxiliary current thus generated is injected into or otherwise drawn from the current that flows through the relay antenna. Thus, such an arrangement is capable of controlling the phase of the current that flows through the relay antenna according to the switching phases of the multiple switches.

Also, the controller may be configured to switch on and off the multiple switches with the same frequency as that of the electric power signal transmitted from the wireless power supply apparatus, or otherwise with a frequency obtained by multiplying or otherwise dividing the frequency of the electric power signal by an odd number.

Also, the multiple switches may include a first switch and a second switch. Also, the N auxiliary coils may include a first auxiliary coil. Also, the first switch and the first auxiliary coil may be arranged in series between the first terminal and the second terminal. Also, the second switch may be arranged in parallel with the first auxiliary coil.

Also, the first switch and the second switch may each comprise: a uni-directional switch; and a rectifier diode arranged in series with the uni-directional switch, in a direction that is the reverse of the direction of an inversely conducting element of the uni-directional switch.

Also, the first switch and the second switch may each be configured as a bi-directional switch. Such an arrangement is capable of relaxing the phase constraints on the switching operation.

Also, the multiple switches may include a first switch, a second switch, a third switch, and a fourth switch. Also, the N auxiliary coils may include a first auxiliary coil and a second auxiliary coil. Also, the first switch and the first auxiliary coil may be arranged in series between the first terminal and the second terminal. Also, the second switch may be arranged in parallel with the first auxiliary coil. Also, the third switch and the second auxiliary coil may be arranged in series between the first terminal and the second terminal. Also, the fourth switch may be arranged in parallel with the second auxiliary coil.

Also, the multiple switches may include a first switch, a second switch, a third switch, and a fourth switch. Also, the N auxiliary coils may include a first auxiliary coil. Also, the first switch and the second switch may be arranged in series between the first terminal and the second terminal. Also, the third switch and the fourth switch may be arranged in series between the first terminal and the second terminal, in parallel with the first switch and the second switch. Also, the first auxiliary coil may be arranged between a connection node that connects the first switch and the second switch and a connection node that connects the third switch and the fourth switch.

Also, the first switch through the fourth switch may each comprise: a uni-directional switch; and a rectifier diode arranged in series with the uni-directional switch, in a direction that is the reverse of the direction of an inversely conducting element of the uni-directional switch.

Also, the first switch through the fourth switch may each be configured as a bi-directional switch.

Yet another embodiment of the present invention also relates to a relay device employed in a resonance wireless power transmission system. The relay device comprises: a relay antenna comprising a power relay coil; and an automatic tuning assist circuit coupled with the relay antenna, and configured to inject a correction current into the relay antenna or otherwise to draw a correction current from the relay antenna. The automatic tuning assist circuit comprises an auxiliary coil. The automatic tuning assist circuit is configured to switch states between (1) a first state in which the auxiliary coil is coupled with the relay antenna so as to inject or otherwise draw, into or otherwise from the relay antenna, a correction current that corresponds to a current that flows through the auxiliary coil, and (2) a second state in which the auxiliary coil is disconnected from the relay antenna such that the current that flows through the auxiliary coil flows through a current path that is independent of the relay antenna.

In a case in which the resonance frequency of the resonance system including the relay antenna matches the frequency of the electric power signal, the current that flows through the auxiliary coil becomes zero. In this state, the correction current becomes zero. In a case in which the resonance frequency of the relay antenna does not match the frequency of the electric power signal, the resonance circuit including the relay antenna has an impedance that functions as a capacitor impedance or otherwise functions as an inductor impedance. Accordingly, a current is induced in the relay antenna with a phase which is delayed or otherwise advanced as compared with the electric power signal. In this state, in a case in which the switches included in the automatic tuning assist circuit are switched on and off in synchronization with the electric power signal, a current flows through the auxiliary coil. The auxiliary current thus generated is injected into or otherwise drawn from the current that flows through the relay antenna. Thus, such an arrangement is capable of controlling the phase of the current that flows through the relay antenna according to the switching phases of the multiple switches.

Also, the states may be switched between the first state and the second state with the same frequency as that of the electric power signal transmitted from the wireless power supply apparatus, or otherwise with a frequency obtained by multiplying or otherwise dividing the frequency of the electric power signal by an odd number.

Also, the automatic tuning assist circuit may be directly coupled with the relay antenna.

Also, the automatic tuning assist circuit may be coupled with the relay antenna via a transformer.

Also, the first terminal may be connected to one end of the power relay coil, and the second terminal may be connected to the other terminal of the power relay coil.

Also, the relay antenna may further comprise a resonance capacitor arranged in series with the power relay coil. Also, the first terminal may be connected to one end of the resonance capacitor, and the second terminal may be connected to the other terminal of the resonance capacitor.

Also, a tap may be provided to the power relay coil. Also, the first terminal may be connected to the tap. Also, the second terminal may be connected to one end of the power relay coil.

Also, the relay antenna may further comprise two resonance capacitors arranged in series with the power relay coil. Also, the first terminal may be connected to one end of one resonance capacitor from among the aforementioned two resonance capacitors, and the second terminal may be connected to the other terminal of the aforementioned one resonance capacitor.

Also, the relay device may further comprise a first coil magnetically coupled with the power relay coil. Also, the first terminal may be connected to one end of the first coil, and the second terminal may be connected to the other end of the first coil.

Also, the relay device may further comprise a transformer having a primary winding connected in series with the relay antenna. Also, the first terminal may be connected to one end of a secondary winding of the transformer, and the second terminal may be connected to the other end of the secondary winding of the transformer.

Yet another embodiment of the present invention relates to a wireless transmission system. The wireless transmission system comprises: a wireless power supply apparatus configured to transmit an electric power signal comprising any one from among an electric field component, magnetic field component, and electromagnetic field component; a wireless power receiving apparatus configured to receive the electric power signal from the wireless power supply apparatus; and any one of the aforementioned relay devices configured to relay the electric power signal from the wireless power supply apparatus to the wireless power receiving apparatus.

Also, such multiple relay devices may be provided to the wireless power transmission system.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 16A and 16B are circuit diagrams each showing a modification of the automatic tuning assist circuit shown in FIG. 13;

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
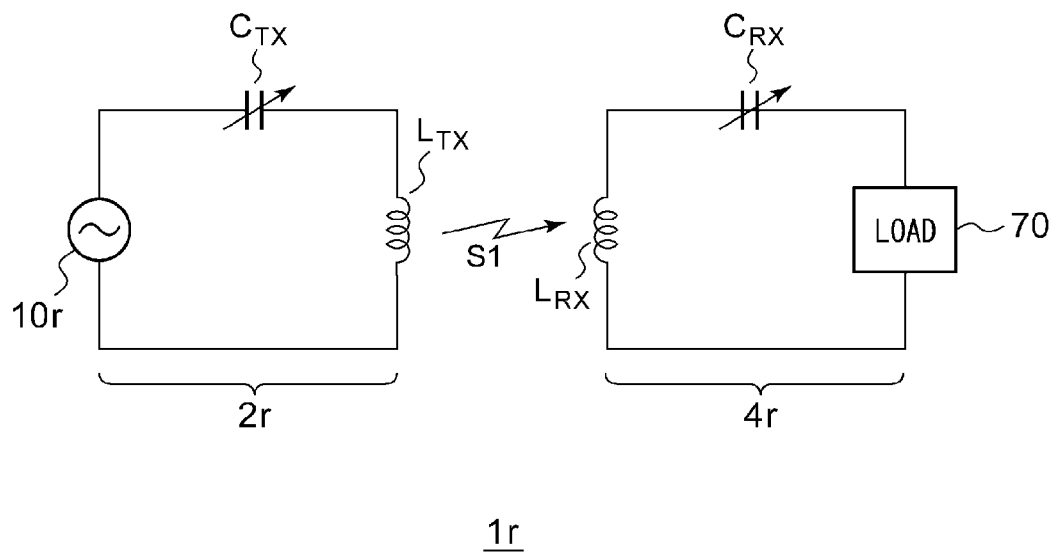
FIG. 1 is a diagram showing a wireless power transmission system according to a comparison technique.
Figure 2:
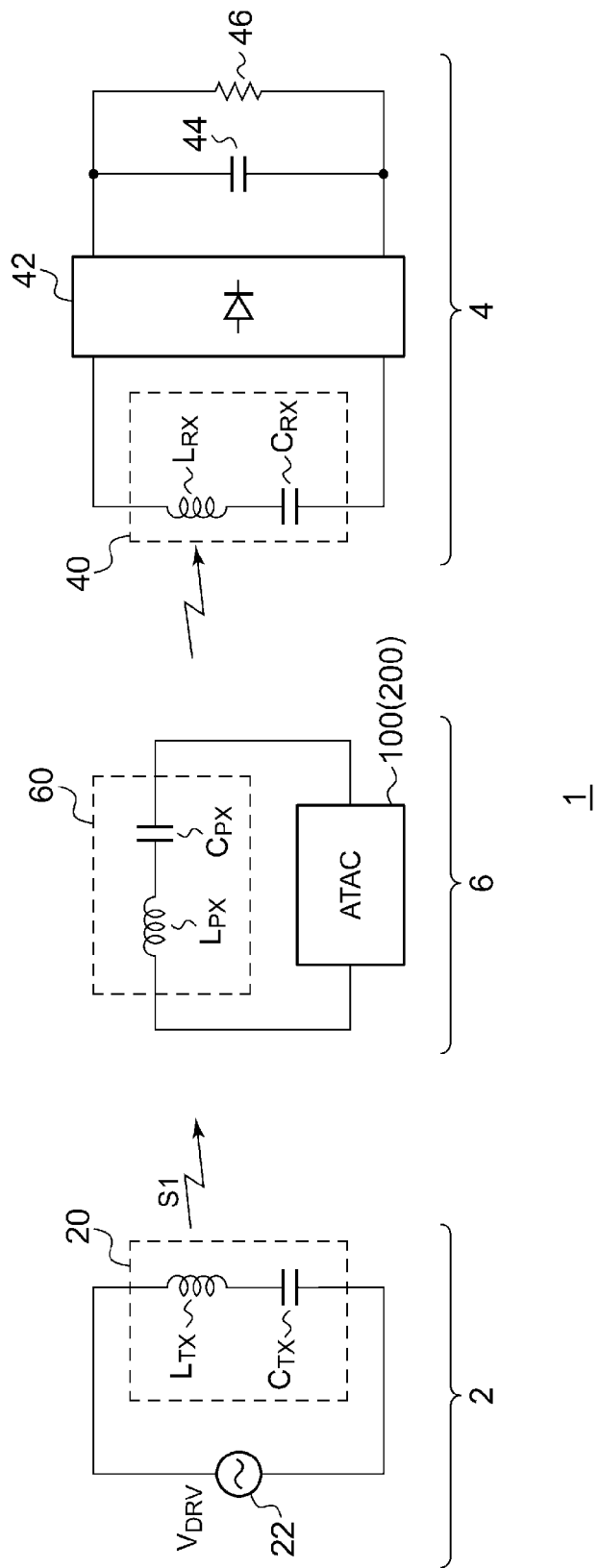
FIG. 2 is a block diagram showing a configuration of a wireless power transmission system according to an embodiment.

FIG. 2 is a block diagram showing a configuration of a wireless power transmission system 1 according to an embodiment. The wireless power transmission system 1 includes a wireless power supply apparatus 2, a wireless power receiving apparatus 4, and a relay device 6.

The wireless power supply apparatus 2 is configured to transmit an electric power signal S1 to the wireless power receiving apparatus 4. The electric power signal S1 is configured using the near-field components (electric field, magnetic field, or electromagnetic field) of electromagnetic waves that have not yet become radio waves. The wireless power supply apparatus 2 includes a transmission antenna 20 and a power supply 22. The transmission antenna 20 includes a transmission coil $L_{TX}$ arranged between its one terminal and its other terminal. A resonance capacitor $C_{TX}$ is arranged in series with the transmission coil $L_{TX}$. The positions of the resonance capacitor $C_{TX}$ and the transmission coil $L_{TX}$ may also be mutually exchanged.

The power supply 22 is configured to apply an AC driving voltage $V_{DRV}$ having a predetermined transmission frequency $f_{TX}$ between the respective terminals of the transmission antenna 20. The driving voltage $V_{DRV}$ may be configured to have a desired AC waveform, examples of which include a rectangular waveform, a trapezoidal waveform, a sine waveform, and the like. The power supply 22 may be configured as a current source which supplies an AC current having a predetermined transmission frequency $f_{TX}$ to the transmission antenna 20. The transmission coil $L_{TX}$ of the transmission antenna 20 is configured to generate the electric power signal S1 according to the current that flows through the transmission coil $L_{TX}$.

The wireless power receiving apparatus 4 is configured to receive the electric power signal S1 transmitted from the wireless power supply apparatus 2 directly, or otherwise indirectly via the relay device 6. The wireless power receiving apparatus 4 includes a reception antenna 40, a rectifier circuit 42, a smoothing capacitor 44, and a load 46.

The reception antenna 40 includes a reception coil $L_{RX}$ and a resonance capacitor $C_{RX}$ arranged in series between its one terminal and its other terminal.

The rectifier circuit 42 and the smoothing capacitor 44 are configured to rectify and smooth the current that flows through the reception coil $L_{RX}$. The voltage that develops at the smoothing capacitor 44 is supplied to the load 46.

The relay device 6 according to the embodiment is configured to relay the electric power signal S1 received from the wireless power supply apparatus 2 to the wireless power receiving apparatus 4.

The relay device 6 includes a relay antenna 60 and an automatic tuning assist circuit 100. The relay antenna 60 includes a power relay coil $L_{PX}$ and a resonance capacitor $C_{PX}$ connected in series. It should be noted that such a resonance capacitor $C_{PX}$ may be omitted. The automatic tuning assist circuit (ATAC) 100 is coupled with the relay antenna 60.

Description will be made regarding the configuration of the automatic tuning assist circuit 100.

First Embodiment

Description will be made in the first embodiment regarding an automatic tuning assist circuit 100 employing a capacitor.

First Example

Figure 3:
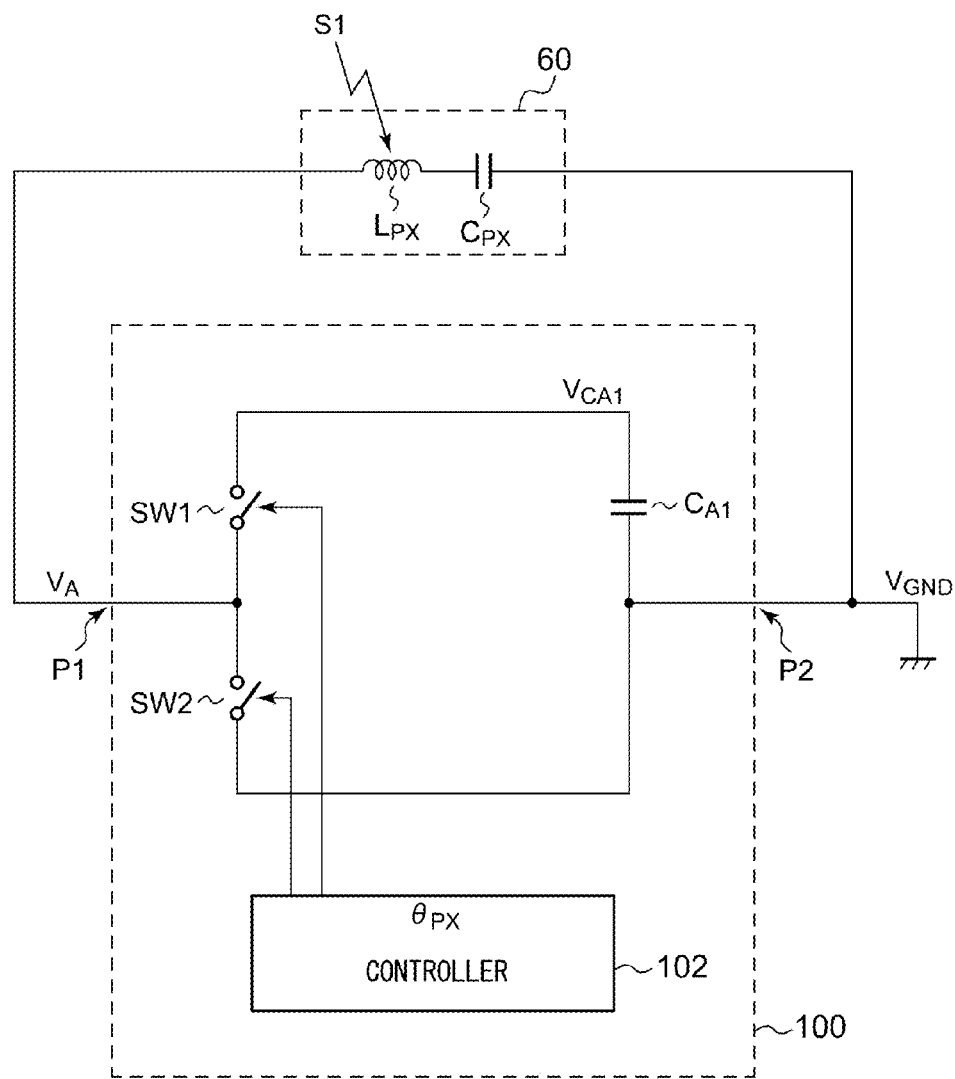
FIG. 3 is a circuit diagram showing a relay device according to a first example.

FIG. 3 is a circuit diagram showing a relay device 6 including an automatic tuning assist circuit according to a first example.

An automatic tuning assist circuit 100 shown in FIG. 3 includes a first terminal P1, a second terminal P2, a first switch SW1, a second switch SW2, a first auxiliary capacitor $C_{A1}$, and a controller 102. Either the first terminal P1 or the second terminal P2 is set to a fixed electric potential. Description will be made in the present embodiment regarding an arrangement in which the second terminal P2 is grounded, and accordingly, the electric potential at the second terminal P2 is fixed to the ground voltage $V_{GND}$. It should be noted that the node to be set to a fixed electric potential is not restricted to the first terminal P1 or the second terminal P2. Also, a different node may be set to a fixed electric potential.

The first switch SW1 and the first auxiliary capacitor $C_{A1}$ are arranged in series between the first terminal P1 and the second terminal P2. The first switch SW1 and the first auxiliary capacitor $C_{A1}$ may be mutually exchanged. The second switch SW2 is arranged between the first terminal P1 and the second terminal P2 such that it is arranged in parallel with the first switch SW1 and the first auxiliary capacitor $C_{A1}$. The first auxiliary capacitor $C_{A1}$ is preferably configured to have a sufficiently large capacitance as compared with the resonance capacitor $C_{PX}$.

The controller 102 is configured to switch on and off the multiple switches SW1 and SW2 with the same frequency as that of the electric power signal S1 transmitted from the wireless power supply apparatus 2, or otherwise a frequency obtained by multiplying or dividing the frequency of the electric power signal S1 by an odd number. For ease of understanding and simplification of description, description will be made in the present embodiment regarding an arrangement in which the switching frequency is the same as that of the electric power signal S1.

With the present embodiment, the controller 102 is configured to switch on and off the first switch SW1 and the second switch SW2 in a complementary manner with the same frequency as that of the electric power signal S1, and with a given phase difference $\theta_{PX}$ with respect to the driving voltage ($V_{DRV}$) which is applied to the transmission antenna in the wireless power supply apparatus 2. The optimum value of the phase difference $\theta_{PX}$ changes according to the position relation between the transmission coil $L_{TX}$, the reception coil $L_{RX}$, and the power relay coil $L_{PX}$. Specifically, the optimum value of the phase difference $\theta_{PX}$ changes according to the distance and the direction between the transmission coil $L_{TX}$, the reception coil $L_{RX}$, and the power relay coil $L_{PX}$; the degree of coupling between the transmission coil, the reception coil, and the power relay coil; and the like. Furthermore, the optimum value of the phase difference $\theta_{PX}$ changes depending on whether a higher priority level is placed on the power supply efficiency or otherwise the power supply amount.

The first switch SW1 and the second switch SW2 are each configured using MOSFETs (Metal Oxide Semiconductor Field Effect Transistors), IGBTs (Insulated Gate Bipolar Transistors), bipolar transistors, or the like. FIGS. 4A through 4F are diagrams each showing an example of such a switch employing MOSFETs.

Figure 4A:
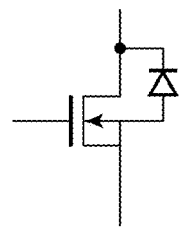
FIGS. 4A through 4F are diagrams each showing an example of a switch using MOSFETs.
Figure 4B:
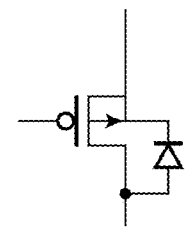
Figure 4C:
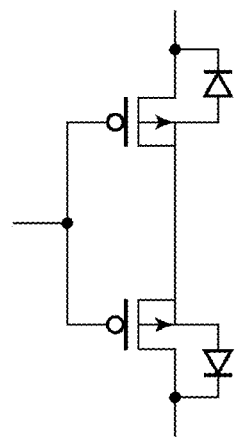
Figure 4D:
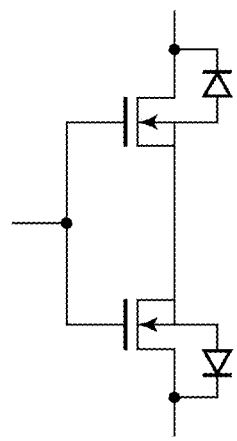
Figure 4E:
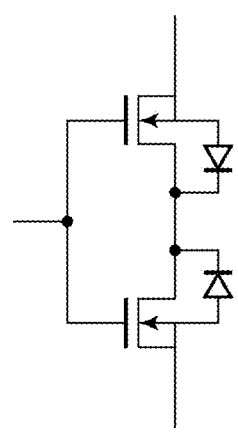
Figure 4F:
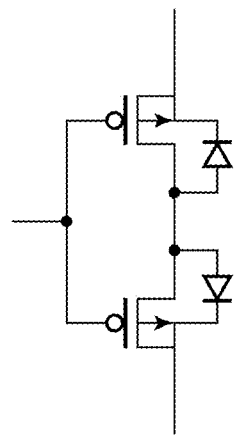

FIG. 4A shows a configuration employing N-channel MOSFETs, and FIG. 4B shows a configuration employing P-channel MOSFETs. In a case in which the back gate of the MOSFET is connected to its source, the body diode that forms between the back gate and the drain is in the connection state regardless of the gate voltage. Thus, such a switch configured as a single MOSFET is not capable of blocking a current that flows in one particular direction. In the present specification, such a switch will be referred to as a "uni-directional switch".

The switches shown in FIGS. 4C through 4F each have a configuration in which two N-channel MOSFETs or otherwise two P-channel MOSFETs are connected such that their respective body diodes are connected in reverse directions (back-to-back connection). With the switches shown in FIGS. 4C through 4F, no current flows in either direction in the off state. In the present specification, such a switch will be referred to as a "bi-directional switch".

With the present embodiment, the switches SW1 and SW2 may each be configured as a uni-directional switch or otherwise a bi-directional switch. It should be noted that, in a case in which the switches SW1 and SW2 are each configured as a uni-directional switch, there is a need to pay attention to their switching phases. Detailed description thereof will be made later.

The above is the first example of the automatic tuning assist circuit 100. Next, description will be made regarding the operation of the wireless power transmission system 1 including the automatic tuning assist circuit 100. Description will be made below as an example assuming that, in the wireless power transmission system 1 shown in FIG. 2, the resonance frequency of the relay antenna 60 deviates by 1.3% from the frequency $f_{TX}$ of the electric power signal S1.

Figure 5:
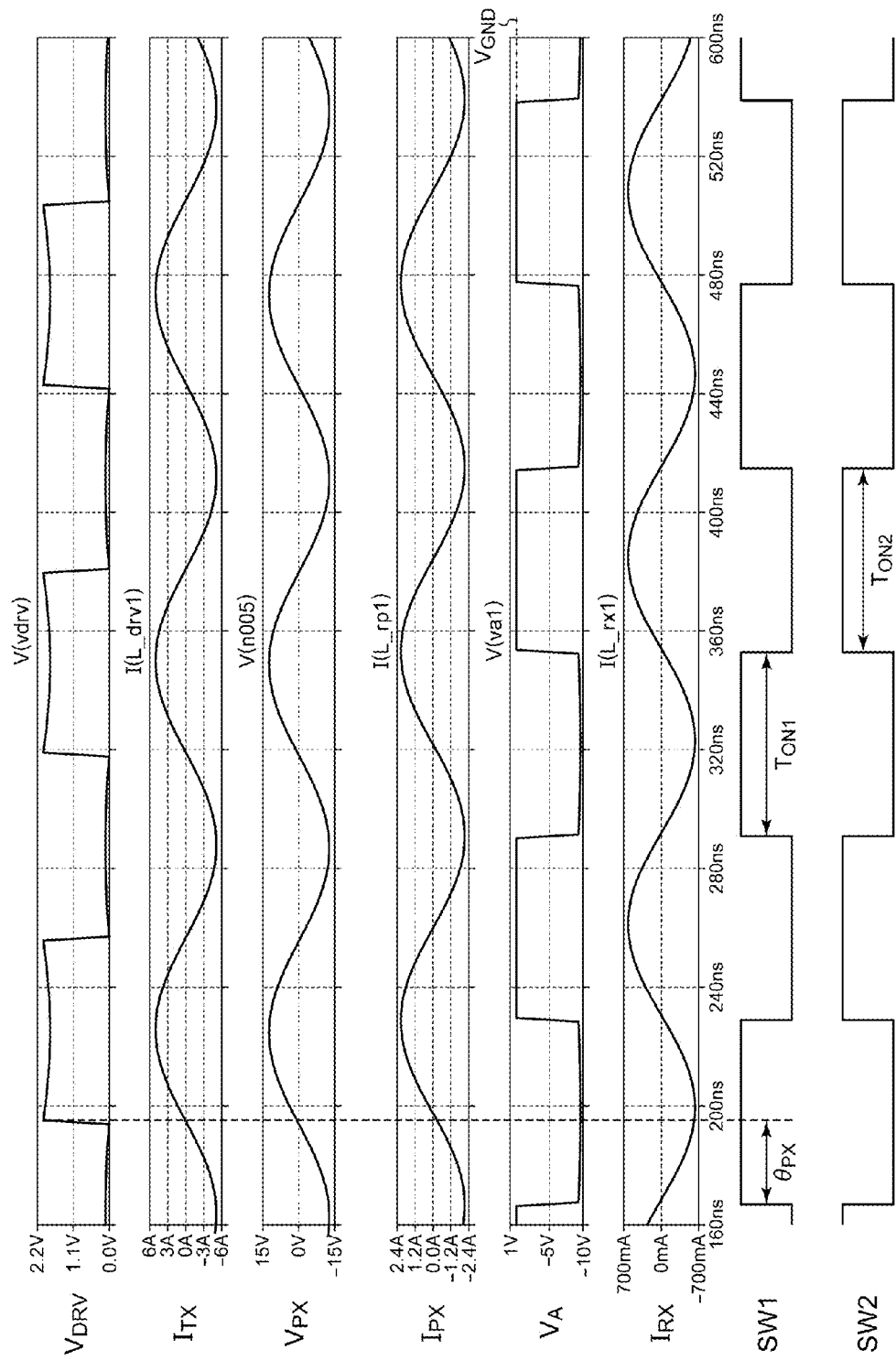
FIG. 5 is an operation waveform diagram showing the operation of the relay device shown in FIG. 3.

FIG. 5 is an operation waveform diagram showing the operation of the automatic tuning assist circuit 100 shown in FIG. 3. FIG. 5 shows, in the following order beginning from the top, the driving voltage $V_{DRV}$ and the transmission current $I_{TX}$ used in the wireless power supply apparatus 2, the resonance voltage $V_{PX}$ that develops between the respective terminals of a circuit comprising the power relay coil $L_{PX}$ and the resonance capacitor $C_{PX}$, the resonance current $I_{PX}$ that flows through the relay antenna 60, the correction voltage $V_A$, the voltages applied to the first switch SW1 and the second switch SW2, and the reception current $I_{RX}$ received by the wireless power receiving apparatus 4. In this simulation, the phase $\theta_{PX}$ of the switching operation of the automatic tuning assist circuit 100 is advanced by 80 degrees with respect to the phase of the driving voltage $V_{DRV}$ used in the wireless power supply apparatus 2.

Figure 6:
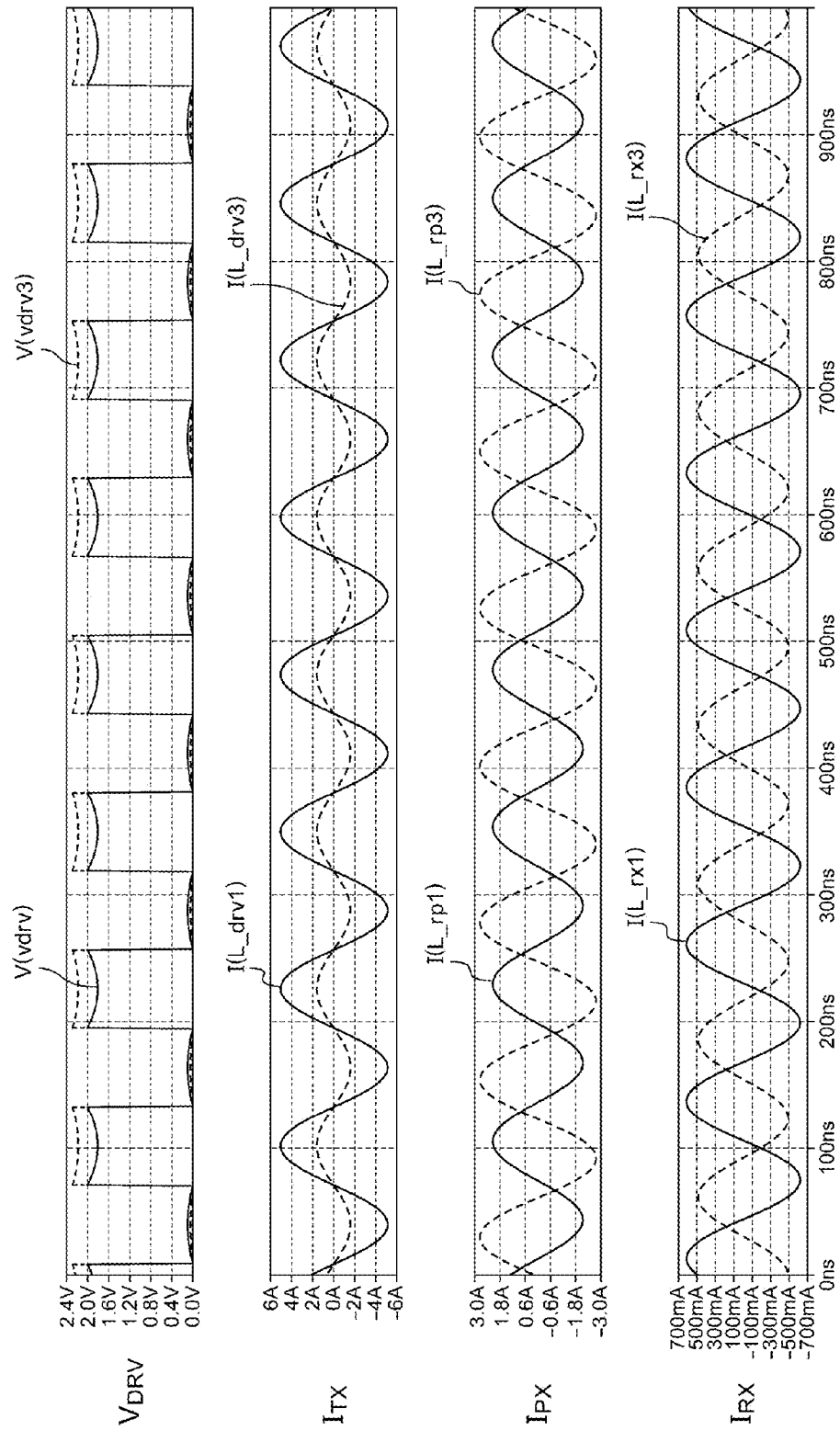
FIG. 6 shows a voltage waveform diagram and a current waveform diagram each showing the overall operation of the wireless power transmission system shown in FIG. 2.

FIG. 6 shows current waveform diagrams and voltage waveform diagrams showing the overall operation of the wireless power transmission system 1 shown in FIG. 2. FIG. 6 shows, in the following order beginning from the top, the driving voltage $V_{DRV}$ of the wireless power supply apparatus 2, the coil current $I_{TX}$ of the wireless power supply apparatus 2, the coil current $I_{PX}$ of the relay device 6, and the coil current $I_{RX}$ of the wireless power receiving apparatus 4. Here, the solid line represents a waveform of a steady state (quasi-resonant state) after a sufficient period of time has elapsed after the automatic tuning assist circuit 100 starts to operate, and the broken line represents a waveform of a non-resonant state in a case in which the automatic tuning assist circuit 100 does not operate or is omitted.

It should be noted that the vertical axis and the horizontal axis shown in the waveform diagrams and the time charts in the present specification are expanded or reduced as appropriate for ease of understanding. Also, each waveform shown in the drawings is simplified for ease of understanding.

The controller 102 is configured to switch on and off the first switch SW1 and the second switch SW2 in a complementary manner with the same frequency as that of the driving voltage $V_{DRV}$ used in the wireless power supply apparatus side and with an optimum phase difference $\theta_{PX}$ for the driving voltage $V_{DRV}$. In this example, the controller 102 performs a switching operation in a complementary manner with a phase difference $\theta_{PX}$=−80 degrees.

During the on time $T_{ON1}$ of the first switch SW1, the resonance current $I_{PX}$ flows through the first auxiliary capacitor $C_{A1}$. During the on time $T_{ON2}$ of the second switch SW2, the resonance current $I_{PX}$ flows to the ground via the second switch SW2. That is to say, the first auxiliary capacitor $C_{A1}$ is charged and discharged using the resonance current $I_{PX}$. As a result, a capacitor voltage $V_{CA1}$ develops at the first auxiliary capacitor $C_{A1}$.

Figure 7:
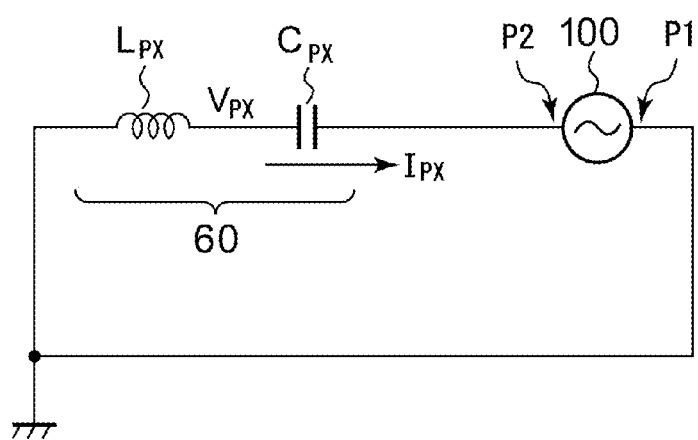
FIG. 7 is an equivalent circuit diagram of the relay device shown in FIG. 3.

The automatic tuning assist circuit 100 is configured to apply the correction voltage $V_A$ to one terminal of the relay antenna 60. During the on time $T_{ON1}$ of the first switch SW1, the correction voltage $V_A$ is set to the first auxiliary capacitor voltage $V_{CA1}$. During the on time $T_{ON2}$ of the second switch SW2, the correction voltage $V_A$ is set to the ground voltage $V_{GND}$. The automatic tuning assist circuit 100 can be regarded as a correction power supply configured to apply the correction voltage $V_A$ to the relay antenna 60. FIG. 7 is an equivalent circuit diagram for the relay device 6 shown in FIG. 3.

Returning to FIG. 6, first, description will be made with reference to the broken line in FIG. 6 regarding a state in which the automatic tuning assist circuit 100 is not operated, i.e., a state in which the first switch SW1 is fixed to the off state and the second switch SW2 is fixed to the on state. This state is equivalent to a state in which the correction voltage $V_A$ is fixed to the ground voltage $V_{GND}$. In this state, the coil current $I_{PX}$ flows through the power relay coil $L_{PX}$, with a phase delayed with respect to the current $I_{TX}$ that flows through the transmission coil $L_{TX}$. The reception coil $L_{RX}$ of the wireless power receiving apparatus 4 receives a composite magnetic field obtained by combining the magnetic field generated by the power relay coil $L_{PX}$ according to the coil current $I_{PX}$ and the magnetic field generated by the transmission coil $L_{TX}$ according to the coil current $I_{TX}$. In this state as represented by the broken line in which the automatic tuning assist circuit 100 is not operated, positive interference does not occur between these magnetic fields. Thus, in this state, the amplitude of the coil current $I_{RX}$ that flows through the reception coil $L_{RX}$ is reduced.

Next, description will be made with reference to the solid line in FIG. 5 regarding a state in which the automatic tuning assist circuit 100 is operated. In a case in which the automatic tuning assist circuit 100 is operated, the correction voltage $V_A$ is applied to the relay antenna 60 with a phase that is advanced by $\theta_{PX}$=80 degrees with respect to the driving voltage $V_{DRV}$, thereby advancing the phase of the coil current $I_{PX}$. Thus, the coil current $I_{PX}$ flows through the power relay coil $L_{PX}$ with the same phase as that of the current $I_{TX}$ that flows through the transmission coil $L_{TX}$, thereby providing a quasi-resonant state. As a result, positive interference occurs at the reception coil $L_{RX}$ between the magnetic field generated by the power relay coil $L_{PX}$ according to the coil current $I_{PX}$ and the magnetic field generated by the transmission coil $L_{TX}$ according to the coil current $I_{TX}$. Thus, such an arrangement is capable of raising the amplitude of the coil current $I_{RX}$ that flows through the reception coil $L_{RX}$, i.e., is capable of increasing the electric power supplied to the load.

One of the advantages of the automatic tuning assist circuit 100 included in the relay device 6 according to the embodiment is that the automatic tuning assist circuit 100 is capable of automatically generating the correction voltage $V_A$ which provides a quasi-resonant state.

Figure 8:
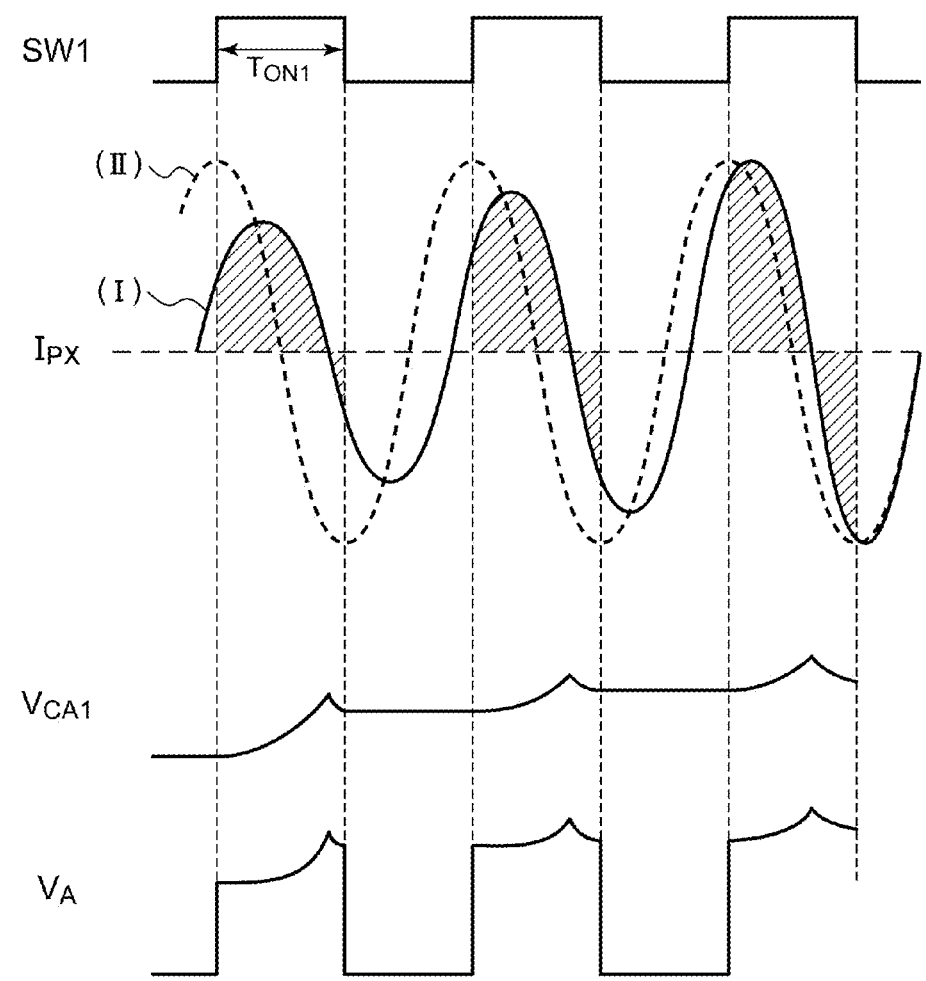
FIG. 8 is a diagram showing a resonance current $I_{PX}$ in the non-resonant state and in the resonant state.

FIG. 8 is a diagram showing the resonance current $I_{PX}$ in the non-resonant state and the resonance current $I_{PX}$ in the resonant state. The waveform (I) represents the resonance current $I_{PX}$ in the non-resonant state. During the on time $T_{ON1}$ of the switch SW1, the first auxiliary capacitor $C_{A1}$ is charged and discharged using the resonance current $I_{PX}$. Specifically, during a period in which the resonance current $I_{PX}$ is positive, the first auxiliary capacitor $C_{A1}$ is charged. During a period in which the resonance current $I_{PX}$ is negative, the first auxiliary capacitor $C_{A1}$ is discharged. As a result, when the period in which the resonance current $I_{PX}$ is positive is longer than the period in which it is negative, the capacitor voltage $V_{CA1}$ is increased. When the period in which the resonance current $I_{PX}$ is negative is longer than the period in which it is positive, the capacitor voltage $V_{CA1}$ is reduced.

Let us consider a case in which the capacitor voltage $V_{CA1}$ is increased in the on time $T_{ON1}$ of a certain cycle. In this case, the correction voltage $V_A$ is applied to the relay antenna 60 according to the capacitor voltage $V_{CA1}$ thus increased. In the next cycle, the phase of the resonance current $I_{PX}$ is advanced as compared with that in the previous cycle. Such an operation is repeatedly performed. As a result, the capacitor voltage $V_{CA1}$ is increased in increments of cycles, thereby gradually advancing the phase of the resonance current $I_{PX}$. Eventually, the phase of the resonance current $I_{PX}$ is shifted to the phase of the resonance point. Conversely, when the phase of the resonance current $I_{PX}$ is excessively advanced, the discharge current that flows from the first auxiliary capacitor $C_{A1}$ becomes greater than the charge current that flows to the first auxiliary capacitor $C_{A1}$, and a feedback operation is provided so as to reduce the capacitor voltage $V_{CA1}$, thereby returning the phase of the resonance current $I_{PX}$ to the resonance point. At the resonance point, such an arrangement provides a balance between the charge current and the discharge current that flow to and from the auxiliary capacitor $C_{A1}$, thereby providing an equilibrium state of the capacitor voltage $V_{CA1}$. Thus, such an arrangement allows a quasi-resonant state to continue. As described above, with the relay device 6 shown in FIG. 2, such an arrangement is capable of automatically generating the correction voltage $V_A$ required to provide such a quasi-resonant state.

The above is the operation of the relay device 6.

With such a relay device 6, without adjustment of the resonance frequency $f_c$ of the relay antenna 60, such an arrangement is capable of automatically tuning the circuit state so as to provide a quasi-resonant state. In the wireless electric power transmission, the resonance frequency changes over time according to the position relation between the wireless power supply apparatus 2 and the wireless power receiving apparatus 4; more specifically, it changes over time according to the degree of coupling k between the transmission coil and the reception coil. By providing such a relay device 6, such an arrangement is capable of following the change in the resonance frequency at a high speed, thereby providing high-efficiency electric power transmission. Furthermore, in a case in which a large amount of electric power is transmitted by means of wireless power transmission, a very high voltage develops between both ends of the resonance capacitor $C_{PX}$, which limits the use of a variable capacitor. With such a relay device 6, there is no need to adjust the capacitance of the resonance capacitor $C_{PX}$. Thus, such an arrangement does not require such a variable capacitor or the like, which is another advantage.

Description has been made above regarding a case in which the first switch SW1 is switched on and off with a phase that is advanced by $\theta_{PX}$ (=80 degrees) with respect to the phase of the driving voltage $V_{DRV}$. It should be noted that the optimum value of the phase difference $\theta_{PX}$ changes according to parameters such as the magnitude relation between the coil constants, the position relation between the coils, the degree of coupling between the coils, and so forth.

As described above, with the wireless power transmission system 1 employing the relay device 6, in order to provide a quasi-resonant state, there is a need to switch on and off the first switch SW1 and the second switch SW2 with a suitable frequency f and with a suitable phase $\theta_{PX}$. In order to meet this requirement, the wireless power supply apparatus 2 may be configured to transmit, to the relay device 6, data which indicates the frequency $f_{TX}$ and the phase $\theta_{PX}$. Alternatively, the relay device 6 may be configured to sweep the phase $\theta_{PX}$ so as to detect the optimum phase $\theta_{PX}$. The same can be said of the embodiments described later.

Second Example

Figure 9:
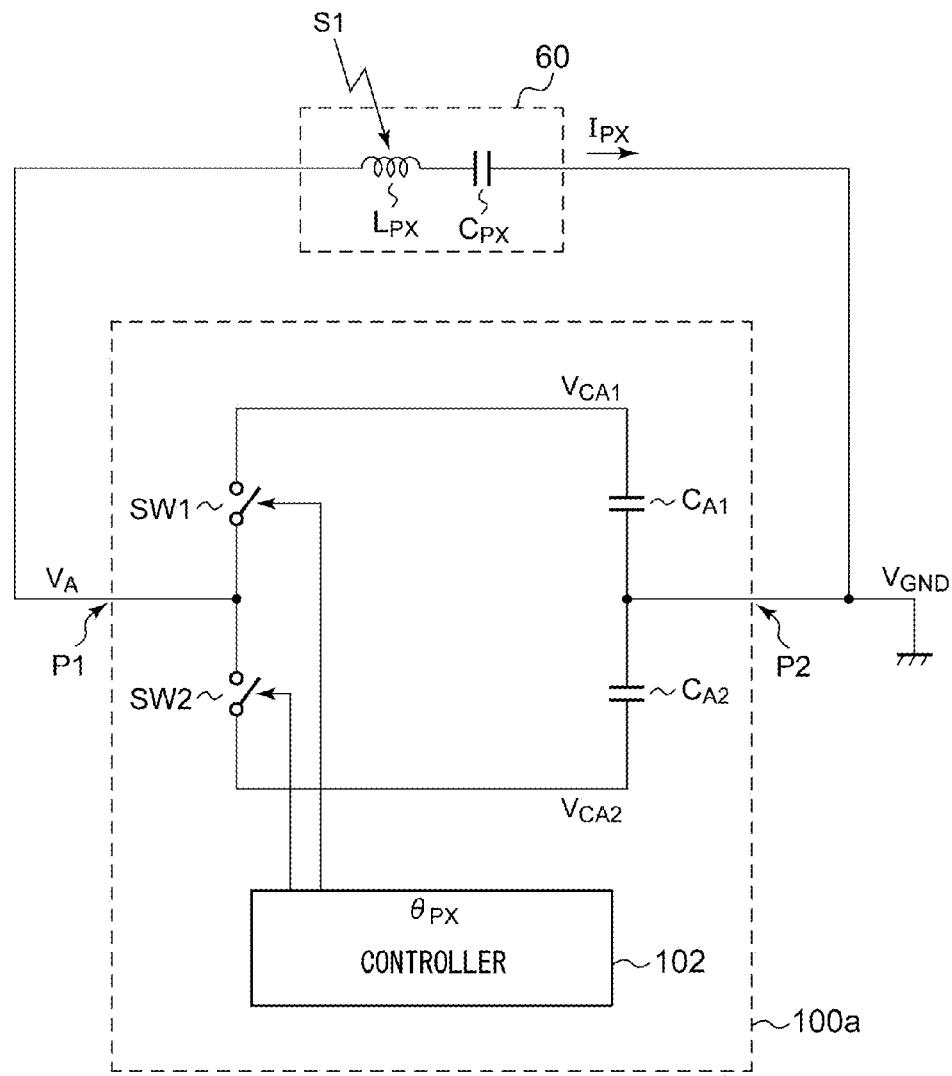
FIG. 9 is a circuit diagram showing a relay device including an automatic tuning assist circuit according to a second embodiment.

Next, description will be made regarding a second example of an automatic tuning assist circuit. FIG. 9 is a circuit diagram showing a relay device 6a including an automatic tuning assist circuit according to the second example. An automatic tuning assist circuit 100a shown in FIG. 9 includes two auxiliary capacitors.

The automatic tuning assist circuit 100a further includes a second auxiliary capacitor $C_{A2}$ in addition to the first terminal P1, the second terminal P2, the first switch SW1, the second switch SW2, the first auxiliary capacitor $C_{A1}$, and the controller 102, shown in FIG. 3. The second auxiliary capacitor $C_{A2}$ is arranged between the first terminal P1 and the second terminal P2 such that it is arranged in series with the second switch SW2. The positions of the second switch SW2 and the second auxiliary capacitor $C_{A2}$ may also be mutually exchanged.

With the automatic tuning assist circuit 100a shown in FIG. 9, during the on time $T_{ON1}$ of the first switch SW1, the correction voltage $V_A$ is set to the capacitor voltage $V_{CA1}$. During the on time $T_{ON2}$ of the second switch SW2, the correction voltage $V_A$ is set to the capacitor voltage $V_{CA2}$.

With such a relay device 6a including the automatic tuning assist circuit 100a, the capacitor voltages $V_{CA1}$ and $V_{CA2}$ are automatically optimized. Thus, such an arrangement provides a quasi-resonant state both in a case in which $f_{TX} > f_c$ and in a case in which $f_{TX} < f_c$.

Third Example

Figure 10:
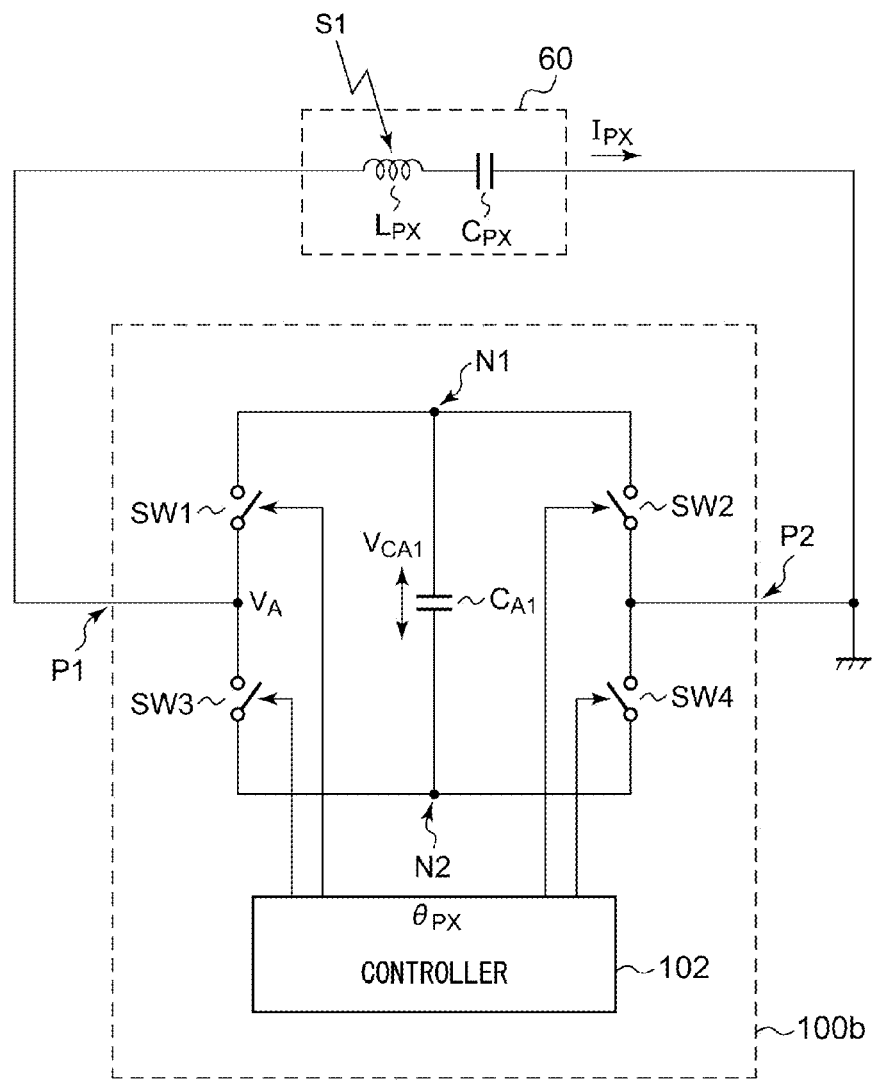
FIG. 10 is a circuit diagram showing a relay device including an automatic tuning assist circuit according to a third embodiment.

Next, description will be made regarding a third example of the automatic tuning assist circuit. FIG. 10 is a circuit diagram showing a relay device 6b including an automatic tuning assist circuit according to the third example. The automatic tuning assist circuit 100b shown in FIG. 10 includes a single auxiliary capacitor, as with the first example. However, between the first example and the second example, there is a difference in the multiple switch topology.

The automatic tuning assist circuit 100b includes a first terminal P1, a second terminal P2, a first switch SW1, a second switch SW2, a third switch SW3, a fourth switch SW4, a first auxiliary capacitor $C_{A1}$, and a controller 102b.

The first switch SW1 through fourth switch SW4 form a so-called H-bridge circuit. Specifically, the first switch SW1 and the second switch SW2 are arranged in series between the first terminal P1 and the second terminal P2. The third switch SW3 and the fourth switch SW4 are sequentially arranged in series between the first terminal P1 and the second terminal P2 such that the circuit comprising the third switch SW3 and the fourth switch SW4 is arranged in parallel with the circuit comprising the first switch SW1 and the second switch SW2.

The first auxiliary capacitor $C_{A1}$ is arranged between a connection node N1 that connects the first switch SW1 and the second switch SW2 and a connection node N2 that connects the third switch SW3 and the fourth switch SW4. The first auxiliary capacitor $C_{A1}$ is preferably configured to have a capacitance that is sufficiently greater than that of the resonance capacitor $C_{PX}$.

The first switch SW1 through the fourth switch SW4 may each be configured as a uni-directional switch. In this case, the controller 102b is configured to switch on and off the first switch SW1 through the fourth switch SW4 with a phase $\theta_{PX}$ such that no current flows through each of the inversely conducting elements. That is to say, the phase $\theta_{PX}$ is restricted.

Alternatively, the first switch SW1 through the fourth switch SW4 may each be configured as a bi-directional switch. In this case, such an arrangement has an advantage of relaxing the constraints of the phase $\theta_{PX}$ of the switching operation of the controller 102b.

Figure 11:
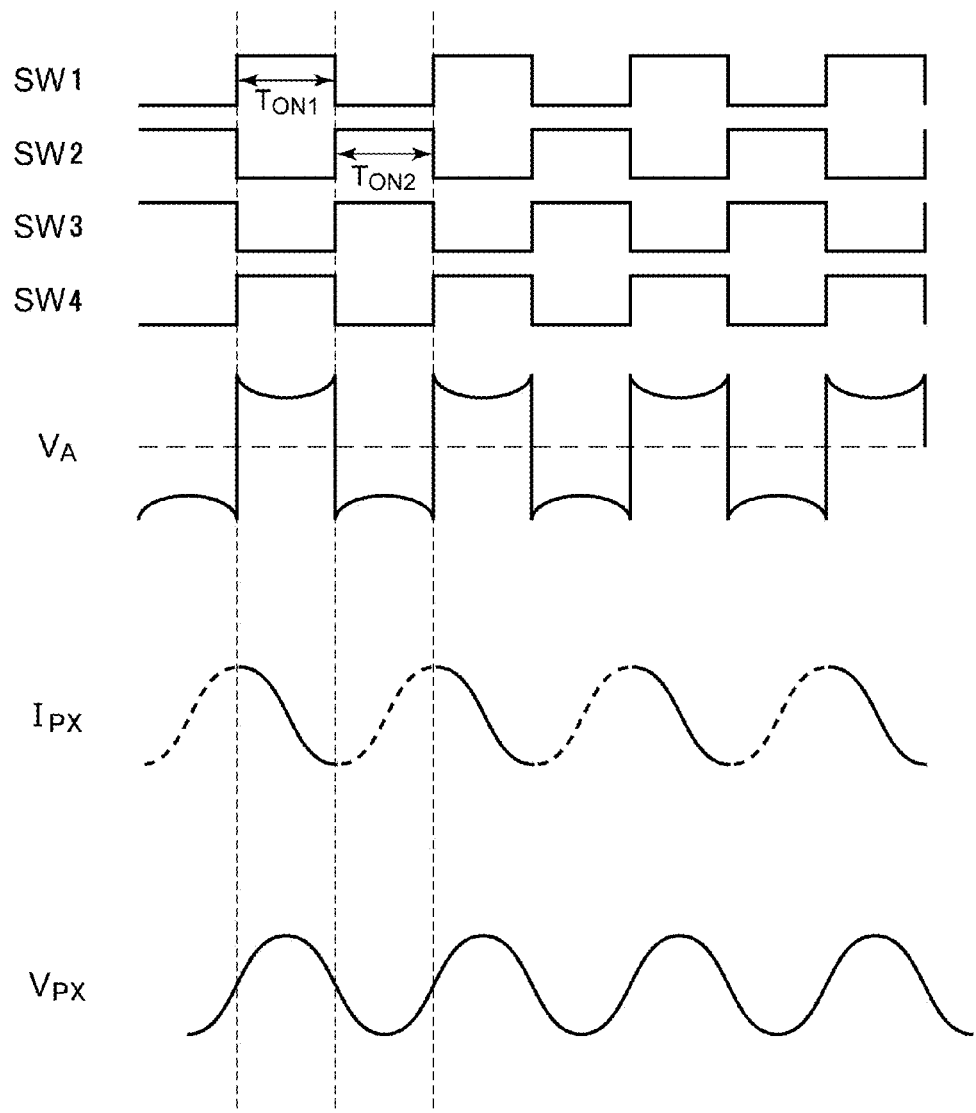
FIG. 11 is an operation waveform diagram showing the operation of the relay device shown in FIG. 10.

The above is the configuration of the automatic tuning assist circuit 100b. Next, description will be made regarding the operation thereof. FIG. 11 shows, in the following order beginning from the top, the voltages applied to the first switch SW1 through the fourth switch SW4, the correction voltage $V_A$, the resonance current $I_{PX}$ that flows through the relay antenna 60, and the resonance voltage $V_{PX}$ that develops between the respective terminals of the circuit that comprises the power relay coil $L_{PX}$ and the resonance capacitor $C_{PX}$. In the waveforms which indicate the voltages applied to the switches, the high-level state represents the on state, and the low-level state represents the off state. It should be noted that FIG. 11 shows the waveforms of the resonance current $I_{PX}$ and the resonance voltage $V_{PX}$ obtained after a sufficient time has elapsed after the automatic tuning assist circuit 100b starts to operate.

A first pair comprising the first switch SW1 and the fourth switch SW4 is switched on and off in a complementary manner with a given phase difference $\theta_{PX}$ with respect to the driving voltage $V_{DRV}$ used in the wireless power supply apparatus side. Here, description will be made as an example regarding an arrangement in which $\theta_{PX}$ is set to 180 degrees (or 0 degrees). A second pair comprising the second switch SW2 and the third switch SW3 is switched on and off in a complementary manner with respect to the first pair. During the on time $T_{ON2}$ of the first pair, the resonance current $I_{PX}$ flows through a path comprising the first switch SW1, the first auxiliary capacitor $C_{A1}$, and the fourth switch SW4. During the on time $T_{ON2}$ of the second pair, the resonance current $I_{PX}$ flows through a path comprising the second switch SW2, the first auxiliary capacitor $C_{A1}$, and the third switch SW3.

The first auxiliary capacitor $C_{A1}$ is charged and discharged by means of the resonance current $I_{PX}$. As a result, the capacitor voltage $V_{CA1}$ develops at the first auxiliary capacitor $C_{A1}$. The automatic tuning assist circuit 100b is configured to apply the correction voltage $V_A$ to one end of the relay antenna 60. During the on time $T_{ON1}$ of the first pair, the correction voltage $V_A$ is set to a first polarity. During the on time $T_{ON2}$ of the second pair, the correction voltage $V_A$ is set to a second polarity. The automatic tuning assist circuit 100b can be regarded as a correction power supply configured to apply the correction voltage $V_A$ to the relay antenna 60. That is to say, the relay device 6b can be regarded as having a configuration represented by the same equivalent circuit diagram as shown in FIG. 7. Thus, it can be clearly understood that the relay device 6b has the same operating mechanism as that shown in FIG. 7.

With such an arrangement, by applying the correction voltage $V_A$ that corresponds to the capacitor voltage $V_{CA1}$ to the relay antenna 60, such an arrangement allows the phase of the resonance current $I_{PX}$ to match the phase of the transmitter-side driving voltage $V_{DRV}$, thereby providing a quasi-resonant state. Furthermore, in the same way as with the first and second examples, the capacitor voltage $V_{CA1}$ is automatically adjusted so as to maintain such a quasi-resonant state.

Summary of Configuration of First Embodiment

Description has been made in the first and second examples regarding an arrangement employing one or two auxiliary capacitors. Also, the number of auxiliary capacitors may be determined as desired so as to provide the same effects, which can be readily understood by those skilled in this art.

Description has been made in the first and second examples regarding an arrangement employing two switches, and description has been made in the third example regarding an arrangement employing four switches. Also, the number of switches to be arranged may be determined as desired so as to provide such a multiple switch topology.

That is to say, by generalizing the first embodiment realized by the first example through the third example, the following technical idea can be derived.

[First Technical Idea]

An automatic tuning assist circuit 100 includes a first terminal P1 and a second terminal P2 coupled with a relay antenna 60, N (N represents an integer) auxiliary capacitors $C_{A1}$ through $C_{AN}$, multiple, i.e., M (M represents an integer) switches SW1 through SWM, and a controller 102. The multiple switches SW1 through SWM are each arranged between two from among the first terminal P1, the second terminal P2, and the terminals of the N auxiliary capacitors $C_{A1}$ through $C_{AN}$. The controller 102 is configured to switch on and off each of the multiple switches SW1 through SWM in synchronization with an electric power signal S1 transmitted from a wireless power supply apparatus.

From another viewpoint, the following technical idea can be derived.

[Second Technical Idea]

An automatic tuning assist circuit 100 includes N (N represents an integer) auxiliary capacitors $C_{A1}$ through $C_{AN}$, multiple, i.e., M (M represents an integer) switches SW1 through SWM, and a controller 102. The multiple switches SW1 through SWM are arranged so as to allow each of the N auxiliary capacitors $C_{A1}$ through $C_{AN}$ to be charged and discharged using a current $I_{PX}$ that flows through the relay antenna 60. The controller 102 is configured to switch on and off the multiple switches SW1 through SWM so as to generate the capacitor voltages $V_{CA1}$ through $V_{CAN}$ at respective ends of each of the N auxiliary capacitors $C_{A1}$ through $C_{AN}$. Furthermore, the controller 102 is configured to apply, to the relay antenna 60, the correction voltage $V_A$ that corresponds to the capacitor voltages $V_{CA1}$ through $V_{CAN}$ respectively generated at the N auxiliary capacitors $C_{A1}$ through $C_{AN}$.

Thus, the present invention is not restricted to such configurations described in the first through third examples. Rather, various kinds of automatic tuning assist circuits configured in various kinds of manners derived based on the first or second technical ideas are encompassed within the technical scope of the present invention.

Next, description will be made regarding a modification of a coupling between the automatic tuning assist circuit 100 and the relay antenna 60.

[Modification 1]

Figure 12:
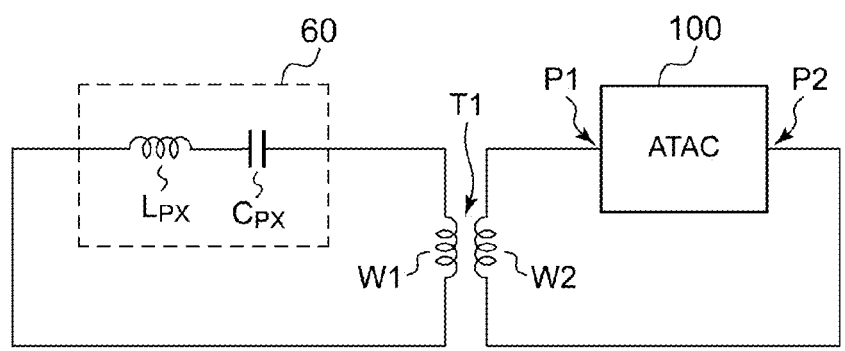
FIG. 12 is a block diagram showing a relay device according to a modification.

FIG. 12 is a block diagram showing a relay device 6c according to a modification. The relay device 6c includes a relay antenna 60, an automatic tuning assist circuit 100, and a transformer T1.

With the relay device 6c, the automatic tuning assist circuit 100 is coupled in series with the relay antenna 60 via the transformer T1. Specifically, the secondary winding W2 of the transformer T1 is arranged between the first terminal P1 and the second terminal P2. The primary winding W1 of the transformer T1 is arranged in series with the relay antenna 60.

With the relay device 6c, energy is transmitted and received between the relay antenna 60 and the automatic tuning assist circuit 100 via the transformer T1. Such an arrangement also provides the same advantages as those provided by the relay device 6 described above.

Second Embodiment

Description has been made regarding the automatic tuning assist circuit 100 employing a capacitor. Also, an arrangement may be made employing an inductor.

Fourth Example

Figure 13:
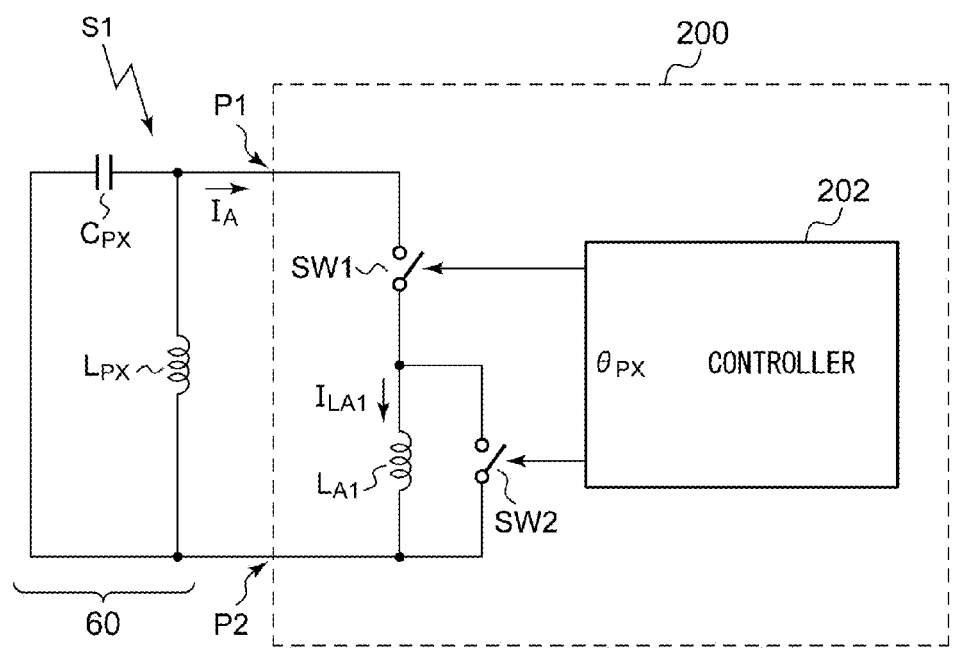
FIG. 13 is a circuit diagram showing a relay device including an automatic tuning assist circuit according to a fourth embodiment.

FIG. 13 is a circuit diagram showing a relay device 6d including an automatic tuning assist circuit 200 according to a fourth example. The automatic tuning assist circuit 200 is coupled with the relay antenna 60. The automatic tuning assist circuit 200 is configured to allow the first correction current $I_A$ to be injected into the relay antenna (in the form of a source current), and to be drawn from the relay antenna 60 (in the form of a sink current). In the example shown in FIG. 13, the automatic tuning assist circuit 200 is directly coupled with the relay antenna 60. Description will be made in the present embodiment with the correction current $I_A$ that flows in the direction from the relay antenna 60 to the automatic tuning assist circuit 30 (in the form of a sink current) as a correction current having a positive value.

The automatic tuning assist circuit 200 shown in FIG. 13 includes a first terminal P1, a second terminal P2, a first switch SW1, a second switch SW2, a first auxiliary coil $L_{A1}$, and a controller 202.

The first terminal P1 and the second terminal P2 are coupled with the relay antenna 60. The first switch SW1 and the first auxiliary coil $L_{A1}$ are arranged in series between the first terminal P1 and the second terminal P2. The positions of the first switch SW1 and the first auxiliary coil $L_{A1}$ may also be mutually exchanged. The second switch SW2 is arranged in parallel with the first auxiliary coil $L_{A1}$.

The controller 202 is configured to switch on and off each of the multiple switches SW1 and SW2 with the same frequency as that of the electric power signal S1 transmitted from the wireless power supply apparatus 2, or otherwise with a frequency obtained by multiplying or dividing the frequency of the electric power signal S1 by an odd number. For ease of understanding and simplification of description, description will be made in the present embodiment regarding an arrangement in which the switching frequency is the same as the frequency of the electric power signal S1.

The automatic tuning assist circuit 200 is configured to repeatedly and alternately switch between the first state φ1 and the second state φ2 with the same frequency as that of the electric power signal S1, or otherwise with a frequency obtained by multiplying or dividing the frequency of the electric power signal S1 by an odd number. Description will be made in the present embodiment regarding an arrangement in which the switching frequency is the same as the frequency $f_{TX}$ of the electric power signal S1.

In the first state φ1, the first switch SW1 is turned on and the second switch SW2 is turned off, which couples the first auxiliary coil $L_{A1}$ with the relay antenna 60. In this state, the correction current $I_A$ that corresponds to the current $I_{LA1}$ that flows through the first auxiliary coil $L_{A1}$ is injected into the relay antenna 60, or otherwise is drawn from the relay antenna 60. In the second state φ2, the second switch SW2 is turned on, and the first switch SW1 is turned off, which disconnects the first auxiliary coil $L_{A1}$ from the relay antenna 60. In this state, the current $I_{LA1}$ that flows through the first auxiliary coil $L_{A1}$ flows through a current path (SW2) that is independent of the relay antenna 60.

The controller 202 may be configured to switch the state between the first state φ1 and the second state φ2 with the same frequency $f_{TX}$ as that of the driving voltage $V_{DRV}$ applied to the transmission antenna in the wireless power supply apparatus (not shown) and with a predetermined phase difference $\theta_{PX}$ with respect to the driving voltage $V_{DRV}$.

As with the first embodiment, each switch may be configured as a uni-directional switch or otherwise a bi-directional switch. It should be noted that, in a case in which each switch is configured as a uni-directional switch, the controller 202 is configured to switch on and off each switch with a phase such that no current flows through each of their inversely conducting elements.

The above is the configuration of the relay device 6d. Next, description will be made regarding the operation thereof.

Description will be made regarding an arrangement in which the switches SW1 and SW2 are each configured as a bi-directional switch configured such that no current flows in either direction in the off state.

Figure 14:
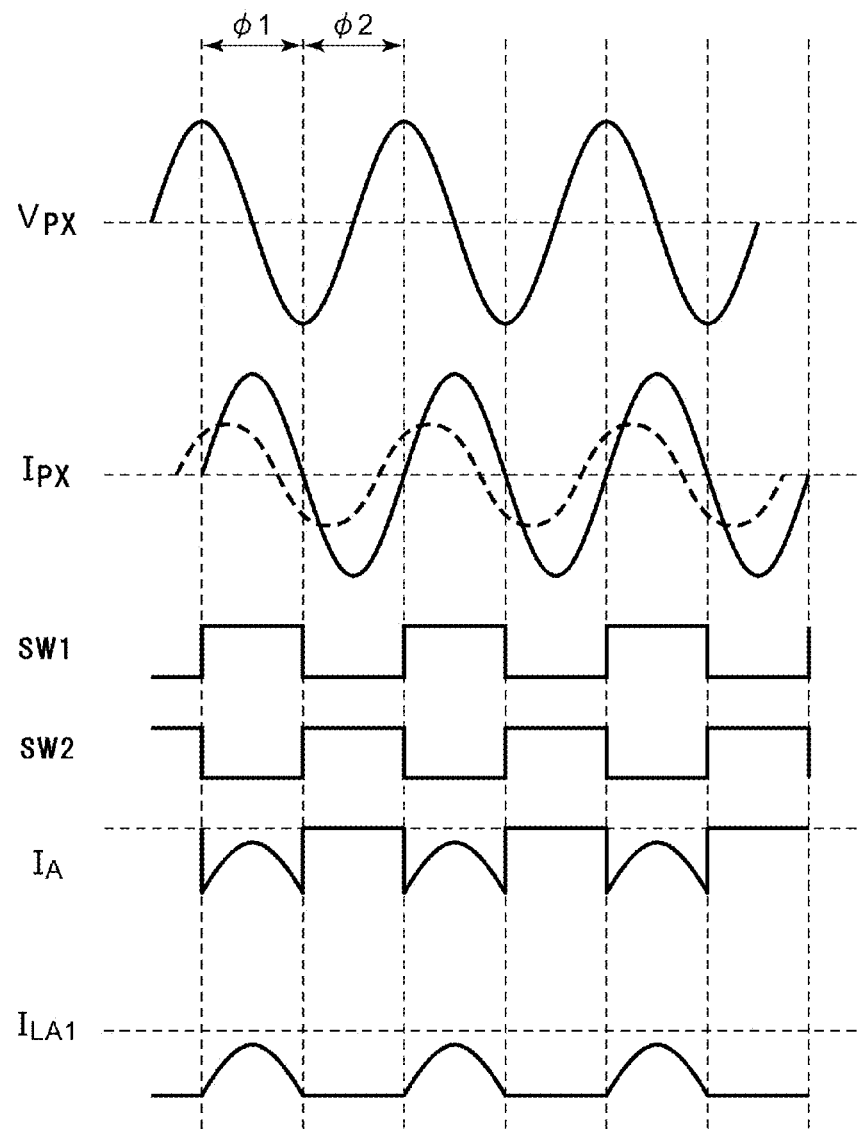
FIG. 14 is an operation waveform diagram showing the operation of the relay device shown in FIG. 13.

FIG. 14 is an operation waveform diagram showing the operation of the relay device 6d shown in FIG. 13. FIG. 14 shows, in the following order beginning from the top, the resonance voltage $V_{PX}$ that develops between the respective terminals of a circuit comprising the power relay coil $L_{PX}$ and the resonance capacitor $C_{PX}$, the resonance current $I_{PX}$ that flows through the relay antenna 60, the voltage applied to the first switch SW1, the voltage applied to the second switch SW2, the correction current $I_A$, and the current $I_{LA1}$ that flows through the first auxiliary coil $L_{A1}$. In the drawing showing the waveforms of the resonance current $I_{PX}$ and the resonance voltage $V_{PX}$, the solid line represents a waveform of a steady state (quasi-resonant state) after a sufficient period of time has elapsed after the automatic tuning assist circuit 200 starts to operate, and the broken line represents a waveform of a non-resonant state in a case in which the automatic tuning assist circuit 200 does not operate.

The controller 202 is configured to switch on and off the first switch SW1 and the second switch SW2 in a complementary manner with the same frequency as that of the driving voltage $V_{DRV}$ and with a predetermined phase difference $\theta_{PX}$ with respect to the driving voltage $V_{DRV}$.

In order to provide a quasi-resonant state, there is a need to switch on and off the first switch SW1 and the second switch SW2 with a suitable frequency $f_{TX}$ and with a suitable phase difference $\theta_{PX}$. In order to meet this requirement, the wireless power supply apparatus 2 may be configured to transmit, to the relay device 6d, data which indicates the frequency $f_{TX}$ and the phase $\theta_{PX}$. Alternatively, the relay device 6d may be configured to sweep the phase $\theta_{PX}$ so as to detect the optimum phase $\theta_{PX}$.

By repeatedly switching the state between the first state φ1 and the second state φ2, such an arrangement allows the magnitude and the direction of the current $I_{LA1}$ that flows through the first auxiliary coil $L_{A1}$ to be made to converge to the resonance point such that the phase difference between the driving voltage $V_{DRV}$ and the resonance current $I_{PX}$ becomes zero, i.e., such that the resonant state is obtained.

In the second state φ2, the current $I_{LA1}$ flows through a loop including the second switch SW2. In this state, the level of the current $I_{LA1}$ is maintained at a constant value. In the first state φ1, the current $I_{LA1}$ is supplied to the relay antenna 60 as the correction current $I_A$. That is to say, the automatic tuning assist circuit 200 can be regarded as a correction current source configured to supply the correction current $I_A$ to the relay antenna 60.

Figure 15:
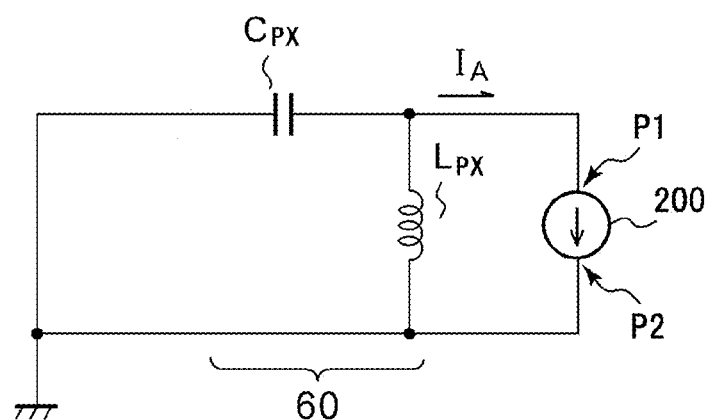
FIG. 15 is an equivalent circuit diagram of the relay device shown in FIG. 13.

FIG. 15 is an equivalent circuit diagram of the relay device 6d shown in FIG. 13. The automatic tuning assist circuit 100 described in the first embodiment employing a capacitor can be regarded as a correction voltage source. In contrast, the automatic tuning assist circuit 200 employing a coil can be regarded as a correction current source configured to supply the correction current $I_A$ to the relay antenna 60.

The above is the operation of the relay device 6.

With the relay device 6d shown in FIG. 13, such an arrangement automatically provides a resonant state without a need to adjust the capacitance of the resonance capacitor $C_{PX}$. Furthermore, with the automatic tuning assist circuit 200, such an arrangement automatically provides the correction current $I_A$ so as to provide a quasi-resonant state.

FIGS. 16A and 16B are circuit diagrams each showing a modification of the automatic tuning assist circuit 200 shown in FIG. 13. The first switch SW1 and the second switch SW2 are each configured as a uni-directional switch.

With such modifications shown in FIGS. 16A and 16B, the first switch SW1 includes a uni-directional switch SW1a and a rectifier diode D1b arranged in series with the uni-directional switch SW1a. The rectifier diode D1b is arranged in a direction that is the reverse of that of a parasitic diode (body diode) D1a that functions as an inversely conducting element that occurs in the uni-directional switch SW1a. The switch SW1a and the rectifier diode D1b may also be mutually exchanged.

The second switch SW2 is configured in the same manner as the first switch SW1. That is to say, the second switch SW2 includes a uni-directional switch SW2a and a rectifier diode D2b arranged in series with the uni-directional switch SW2a. The rectifier diode D2b is arranged in a direction that is the reverse of that of a parasitic diode (body diode) D2a that functions as an inversely conducting element that occurs in the uni-directional switch SW2a. The switch SW2a and the rectifier diode D2b may also be mutually exchanged.

By arranging the rectifier diode D1b (D2b) in a direction that is the reverse of that of the parasitic diode D1a (D2a), such an arrangement is capable of preventing the first switch SW1 and the second switch SW2 turning on at an unintended timing.

It should be noted that, in a case in which the first switch SW1 and the second switch SW2 are each configured as a bi-directional switch, the automatic tuning assist circuit 200 allows the correction voltage $I_A$ to have both a positive value and a negative value. In contrast, the automatic tuning assist circuit 200a shown in FIG. 16A is capable of generating the correction current $I_A$ having a positive value. However, the automatic tuning assist circuit 200a cannot generate the correction current $I_A$ having a negative value. Conversely, the automatic tuning assist circuit 200b shown in FIG. 16B is capable of generating the correction value having a negative value. However, the automatic tuning assist circuit 200b cannot generate the correction value $I_A$ having a positive value. That is to say, with the automatic tuning assist circuits 200a and 200b shown in FIGS. 16A and 16B, the switching phases of the first switch SW1 and the second switch SW2 are restricted.

Fifth Example

Figure 17:
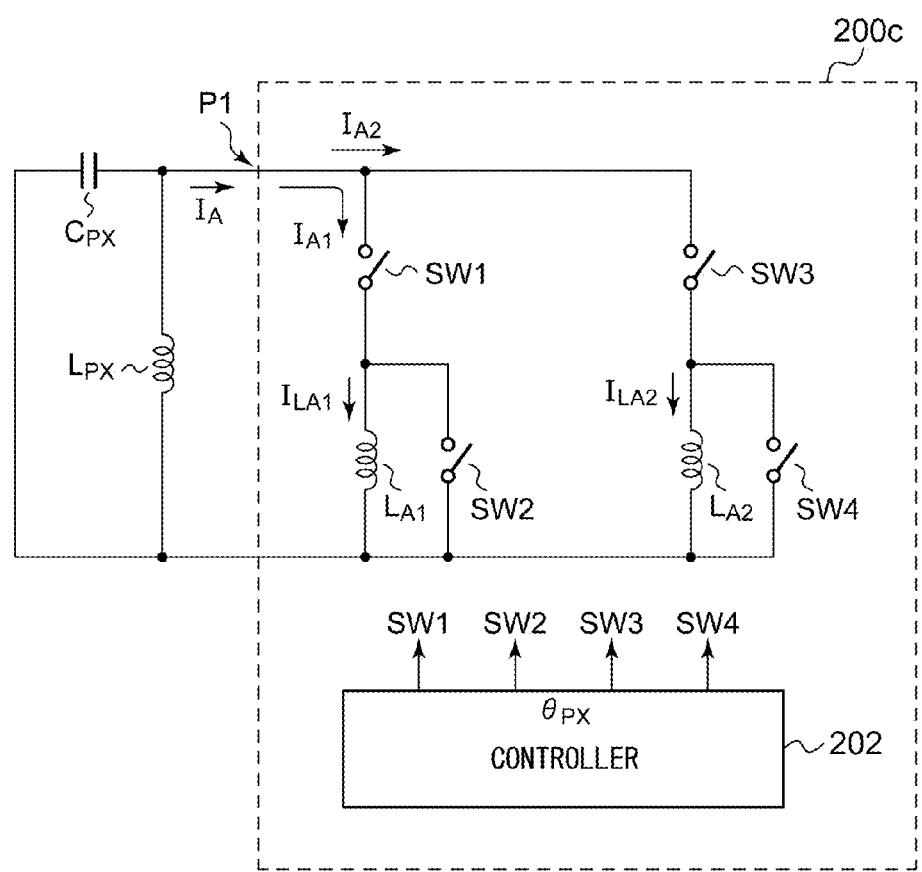
FIG. 17 is a circuit diagram showing a relay device including an automatic tuning assist circuit according to a fifth embodiment.

FIG. 17 is a circuit diagram showing a relay device 6e including an automatic tuning assist circuit 200c according to a fifth example.

The automatic tuning assist circuit 200c includes a third switch SW3, a fourth switch SW4, and a second auxiliary coil $L_{A2}$, in addition to the configuration of the automatic tuning assist circuit 200 shown in FIG. 13. The third switch SW3 and the second auxiliary coil $L_{A2}$ are arranged in series between the first terminal P1 and the second terminal P2. The third switch SW3 and the second auxiliary coil $L_{A2}$ may be mutually exchanged. The fourth switch SW4 is arranged in parallel with the second auxiliary coil $L_{A2}$. In the first state $\varphi 1$, the controller 202 is configured to turn on the first switch SW1 and the fourth switch SW4. In the second state $\varphi 2$, the controller 202 is configured to turn on the second switch SW2 and the third switch SW3.

The above is the configuration of the relay device 6e. Next, description will be made regarding the operation thereof.

Figure 18:
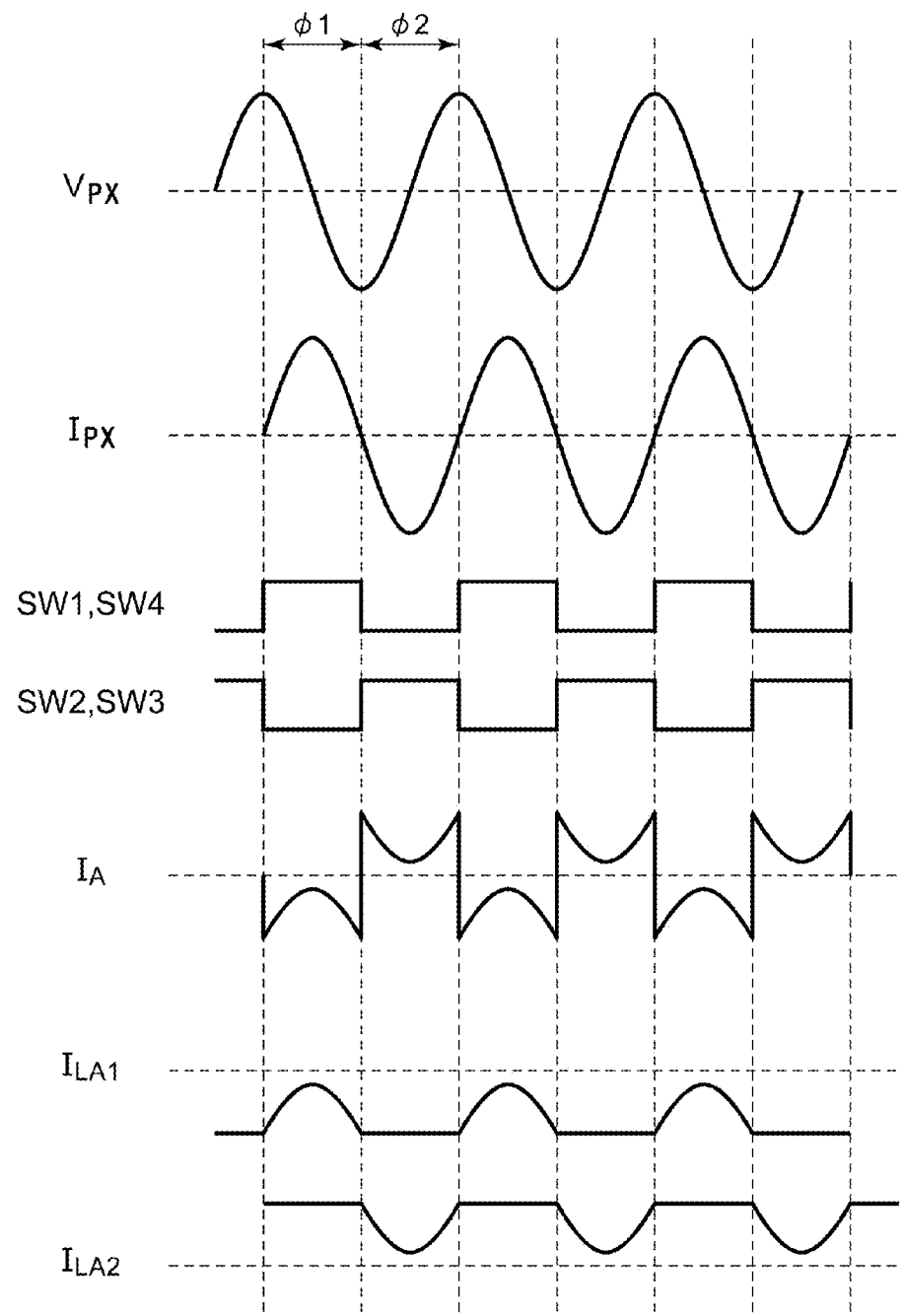
FIG. 18 is an operation waveform diagram showing the operation of the relay device shown in FIG. 17.

FIG. 18 is an operation waveform diagram showing the operation of the relay device 6e shown in FIG. 17.

In the first state $\varphi 1$, the first auxiliary coil $L_{A1}$ is coupled with the relay antenna 60. In this state, the first correction current $I_A$ that corresponds to the current $I_{LA1}$ that flows through the first auxiliary coil $L_{A1}$ is injected into the relay antenna 60, or otherwise is drawn from the relay antenna 60. In this state, the second auxiliary coil $L_{A2}$ is disconnected from the relay antenna 60. Thus, the current $I_{LA2}$ that flows through the second auxiliary coil $L_{A2}$ flows through a current path that is independent of the relay antenna 60.

In the second state $\varphi 2$, the first auxiliary coil $L_{A1}$ is disconnected from the relay antenna 60. Thus, the current $I_{LA1}$ that flows through the first auxiliary coil $L_{A1}$ flows through a current path that is independent of the relay antenna 60. In this state, the second auxiliary coil $L_{A2}$ is coupled with the relay antenna 60. Thus, the second correction current $I_{A2}$ that corresponds to the current $I_{LA2}$ that flows through the second auxiliary coil $L_{A2}$ is injected into the relay antenna 60, or otherwise is drawn from the relay antenna 60.

That is to say, the two auxiliary coils $L_{A1}$ and $L_{A2}$ are coupled with the relay antenna 60 in a complementary manner. Thus, the correction currents $I_{A1}$ and $I_{A2}$ are alternately supplied to the relay antenna 60. From another viewpoint, it can be understood that the automatic tuning assist circuit 200a shown in FIG. 17 includes two automatic tuning assist circuits 200 shown in FIG. 13 configured to operate with reverse phases. With such an arrangement, the correction current $I_{A1}$ supplied by the first auxiliary coil $L_{A1}$ and the correction current $I_{A2}$ supplied by the second auxiliary coil $L_{A2}$ have opposite polarities. The correction current $I_A$ supplied to the relay antenna 60 is configured as the sum of the two correction currents $I_{A1}$ and $I_{A2}$.

With the relay device 6e, such an arrangement provides the same advantages as those in the fourth example.

Figure 19:
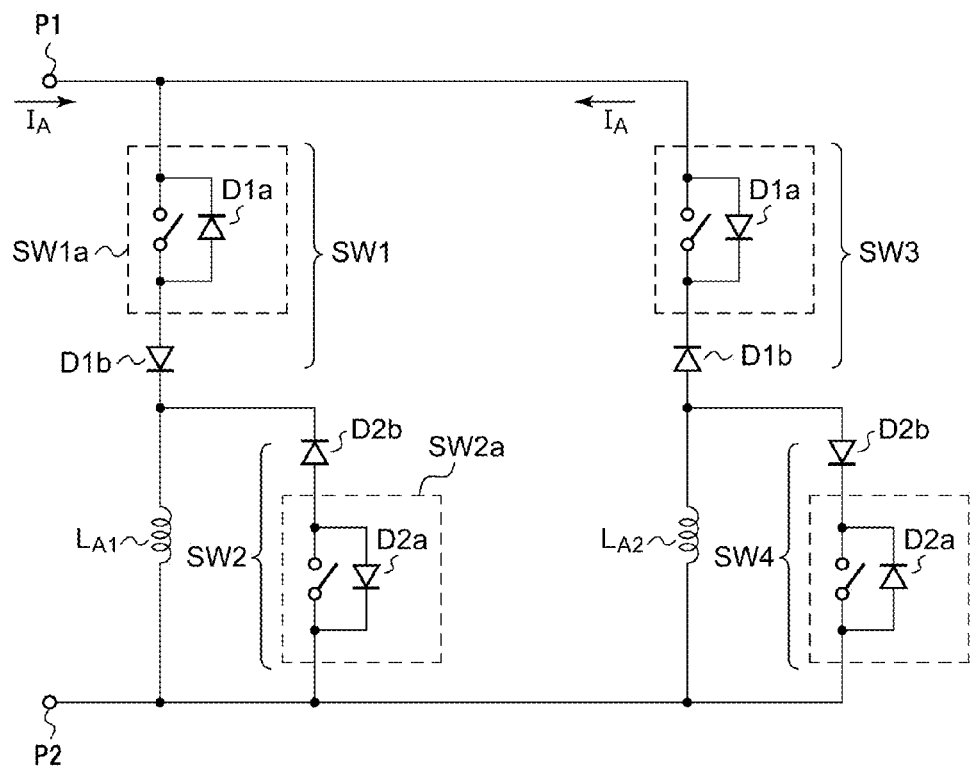
FIG. 19 is a circuit diagram showing a modification of the automatic tuning assist circuit shown in FIG. 17.

FIG. 19 is a circuit diagram showing a modification of an automatic tuning assist circuit 200c shown in FIG. 17. With such a modification, the first switch SW1 through the fourth switch SW4 are each configured using a uni-directional switch. With the automatic tuning assist circuit 200d shown in FIG. 19, the first switch SW1 and the second switch SW2 are each configured in the same manner as shown in FIG. 16A, and the third switch SW3 and the fourth switch SW4 are each configured in the same manner as shown in FIG. 16B. Such a modification provides the same advantages as those provided by the automatic tuning assist circuit 200c shown in FIG. 17.

Sixth Example

Figure 20:
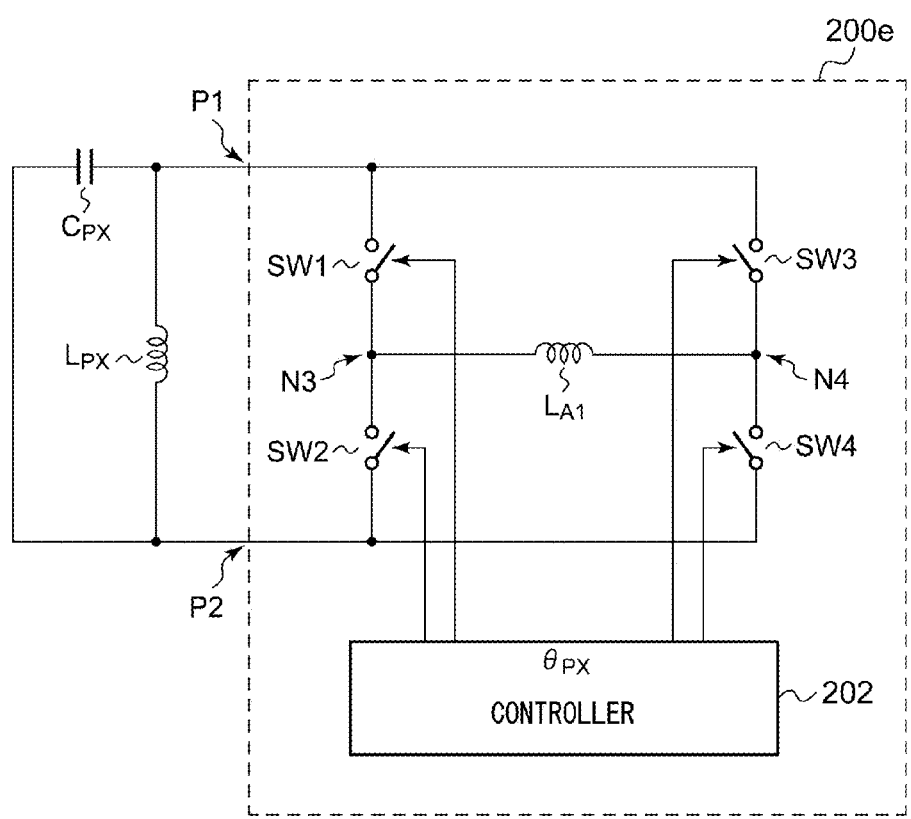
FIG. 20 is a circuit diagram showing a relay device including an automatic tuning assist circuit according to a sixth embodiment.

FIG. 20 is a circuit diagram showing a relay device 6f including an automatic tuning assist circuit 200e according to a sixth example.

The automatic tuning assist circuit 200e includes a first switch SW1 through a fourth switch SW4 and a first auxiliary coil $L_{A1}$ that form an H-bridge circuit. Specifically, the first switch SW1 and the second switch SW2 are arranged in series between the first terminal P1 and the second terminal P2. The third switch SW3 and the fourth switch SW4 are arranged in series between the first terminal P1 and the second terminal P2 such that the series circuit that comprises the third switch SW3 and the fourth switch SW4 is arranged in parallel with the series circuit that comprises the first switch SW1 and the second switch SW2. The first auxiliary coil $L_{A1}$ is arranged between a connection node N3 that connects the first switch SW1 and the second switch SW2 and a connection node N4 that connects the third switch SW3 and the fourth switch SW4.

The first switch SW1 through the fourth switch SW4 may each be configured as a uni-directional switch, or may each be configured as a bi-directional switch. In a case in which each switch is configured using a bi-directional switch, the switches SW1 through SW4 may be configured as are the switches SW1 through SW4 shown in FIG. 19.

The controller 202 is configured to switch states between a first state φ1 in which a pair comprising the first switch SW1 and the fourth switch SW4 is turned on and a second state φ2 in which a pair comprising the second switch SW2 and the third switch SW3 is turned on, with the same frequency as that of the electric power signal S1.

With the automatic tuning assist circuit 200e shown in FIG. 20, such an arrangement requires only a single auxiliary coil to generate the correction current with both a positive polarity and a negative polarity.

Summary of Configuration of Second Embodiment

Description has been made in the fourth and fifth examples regarding an arrangement employing one or two auxiliary coils. Also, such an automatic tuning assist circuit having the same functions can be configured using a desired number of auxiliary coils, which can be readily understood by those skilled in this art.

Description has been made in the fourth example regarding an arrangement employing two switches, and description has been made in the fifth and sixth examples regarding an arrangement employing four switches. Also, the multiple switch topology may be modified as appropriate according to the number of the auxiliary coils, which can be clearly understood by those skilled in this art.

That is to say, by generalizing the second embodiment realized by the fourth example through the sixth example, the following technical idea can be derived.
[Third Technical Idea]

An automatic tuning assist circuit 200 includes a first terminal P1 and a second terminal P2 coupled with a relay antenna 60, N (N represents an integer) auxiliary coils $L_{A1}$ through $L_{AN}$, multiple, i.e., M (M represents an integer) switches SW1 through SWM, and a controller 202. The multiple switches SW1 through SWM are arranged between two from among the first terminal P1, the second terminal P2, and the terminals of the N auxiliary coils $L_{A1}$ through $L_{AN}$. The controller 202 is configured to switch on and off each of the multiple switches SW1 through SWM in synchronization with an electric power signal S1 transmitted from a wireless power supply apparatus.

From another viewpoint, the following technical idea can be derived.
[Fourth Technical Idea]

The automatic tuning assist circuit 200 includes the auxiliary coil $L_A$. The automatic tuning assist circuit 200 is configured to alternately and repeatedly switch the state between (1) the first state φ1 in which the auxiliary coil $L_A$ is coupled with the relay antenna 60, and the correction current $I_A$ that corresponds to the current $I_{LA}$ that flows through the auxiliary coil $L_A$ is injected into the relay antenna 60 or otherwise is drawn from the relay antenna 60, and (2) the second state φ2 in which the auxiliary coil $L_A$ is disconnected from the relay antenna 60, and the current $I_{LA}$ that flows through the auxiliary coil $L_A$ flows through a current path that is independent of the relay antenna 60.

Thus, the present invention is not restricted to such configurations described in the fourth through sixth examples. Rather, various kinds of automatic tuning assist circuits configured in various kinds of manners derived based on the third or fourth technical idea are encompassed within the technical scope of the present invention.

Next, description will be made regarding a modification of a coupling between the automatic tuning assist circuit 200 and the relay antenna 60.

FIGS. 21A through 21F are circuit diagrams each showing a modification of a coupling between the automatic tuning assist circuit 200 and the relay antenna 60. With such modifications shown in FIGS. 21A through 21D, the automatic tuning assist circuit 200 is directly coupled with the relay antenna 60. With such modifications shown in FIGS. 21E and 21F, the automatic tuning assist circuit 200 is magnetically coupled with the relay antenna 60.

Figure 21A:
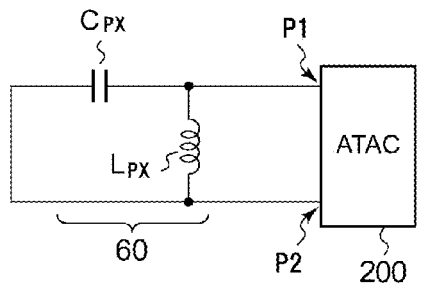
FIGS. 21A through 21F are circuit diagrams each showing a modification of a coupling between the automatic tuning assist circuit and the relay antenna.

FIG. 21A shows a modification having the same coupling configuration as that shown in FIGS. 13, 17, and 20. With such a modification shown in FIG. 21B, the automatic tuning assist circuit 200 is coupled with the resonance capacitor $C_{PX}$. With such a modification shown in FIG. 21C, a tap 63 is provided to the power relay coil $L_{PX}$. The first terminal P1 of the automatic tuning assist circuit 200 is connected to the tap 63. The second terminal P2 of the automatic tuning assist circuit 200 is connected to one end of the power relay coil $L_{PX}$.

Figure 21B:
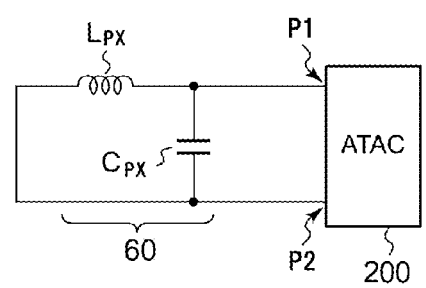
Figure 21C:
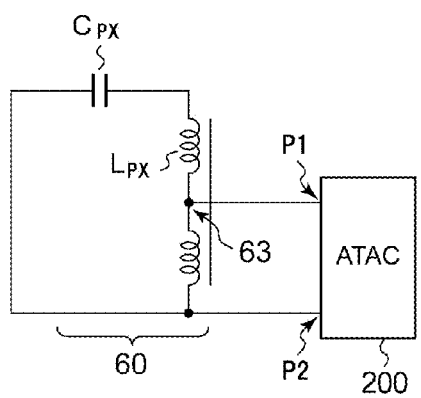
Figure 21D:
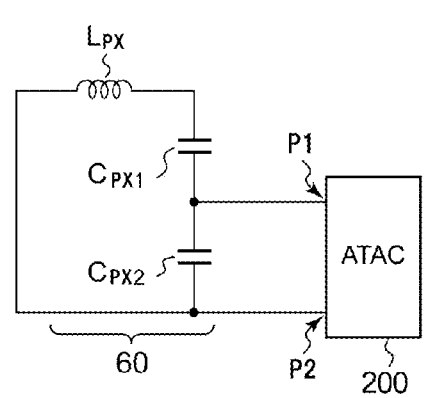

The relay antenna 60 shown in FIG. 21D includes a power relay coil $L_{PX}$ and two resonance capacitors $C_{PX1}$ and $C_{PX2}$ arranged in series with the power relay coil $L_{PX}$. The automatic tuning assist circuit 200 is configured to have its first terminal P1 connected to one end of the resonance capacitor $C_{PX2}$, and to have its second terminal P2 connected to the other end of the resonance capacitor $C_{PX2}$.

Figure 21E:
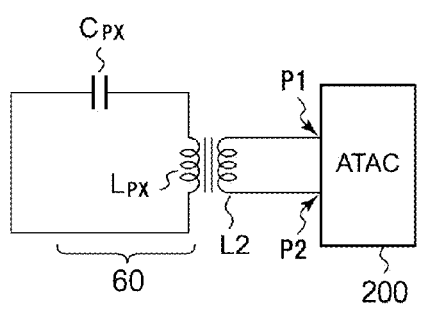

A relay device shown in FIG. 21E further includes a second coil L2 magnetically coupled with the power relay coil $L_{PX}$. The automatic tuning assist circuit 200 is configured to have its first terminal P1 connected to one end of the second coil L2, and to have its second terminal P2 connected to the other end of the second coil L2.

Figure 21F:
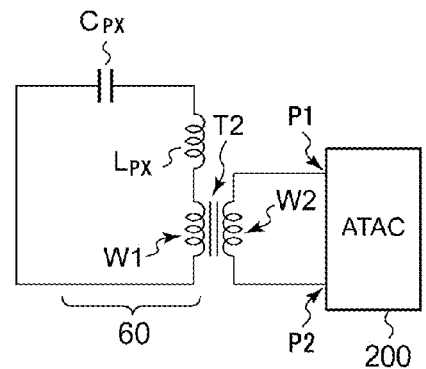

A relay device shown in FIG. 21F further includes a transformer T2. The primary winding W1 of the transformer T2 is arranged in series with the power relay coil $L_{PX}$. The automatic tuning assist circuit 200 is configured to have its first terminal P1 connected to one end of the secondary winding W2, and to have its second terminal P2 connected to the other end of the secondary winding W2.

With such modifications shown in FIGS. 21A through 21F, or otherwise with circuits having similar configurations, such an arrangement is capable of providing a quasi-resonant state.

Furthermore, with such arrangements shown in FIGS. 21C through 21F, such an arrangement allows the voltage between the terminals P1 and P2 of the automatic tuning assist circuit 200 to be reduced, as compared with arrangements shown in FIGS. 21A and 21B. Thus, such an arrangement allows a low breakdown voltage element to be employed as a switch which is a component of the automatic tuning assist circuit 200. This facilitates the circuit design, or this provides a reduced cost.

Description has been made regarding the present invention with reference to the first embodiment and the second embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made with reference to FIG. 2 regarding an arrangement in which only the relay device 6 includes the automatic tuning assist circuit 100 (200). However, the present invention is not restricted to such an arrangement. For example, such an automatic tuning assist circuit 100 (200) may be mounted on the wireless power supply apparatus 2. Also, such an automatic tuning assist circuit 100 (200) may be mounted on the wireless power receiving apparatus 4, as with the relay device 6.

Figure 22:
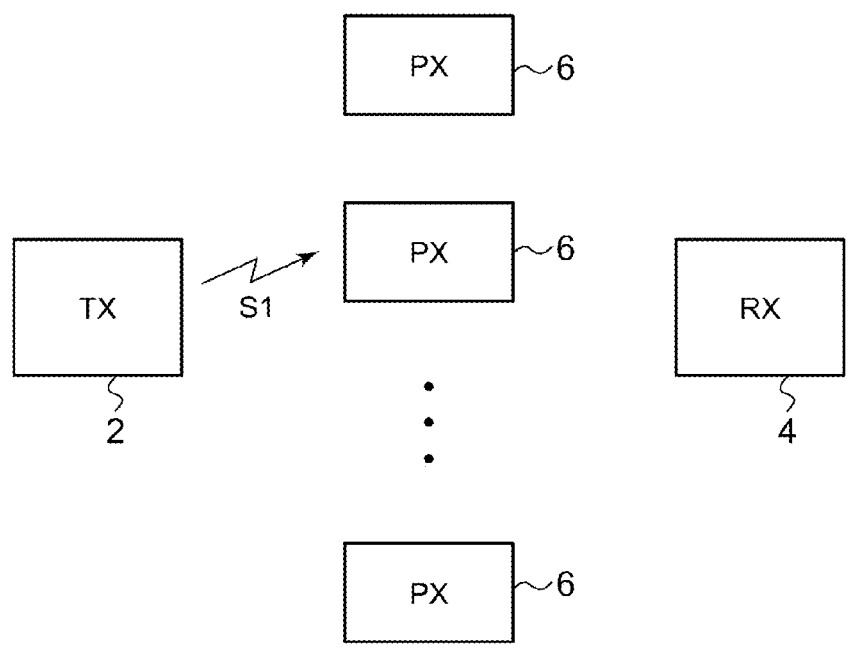
FIG. 22 is a block diagram showing a wireless power transmission system according to a modification.

Description has been made in the embodiment with reference to FIG. 2 regarding an arrangement in which a single relay device 6 is provided. However, the present invention is not restricted to such an arrangement. FIG. 22 is a block diagram showing a wireless power transmission system 1a according to a modification. The wireless power transmission system 1a shown in FIG. 22 includes multiple relay devices 6. The multiple relay devices 6 may be arranged in the form of an array. The multiple relay devices 6 each include the automatic tuning assist circuit 100 (200).

With the multiple relay devices 6, by synchronously operating their respective automatic tuning assist circuits 100 (200), such an arrangement is capable of optimizing the correction voltage $V_A$ or the correction current $I_A$ so as to follow a change in the conditions for resonance even if the conditions for resonance fluctuate due to a change in the interaction between the wireless power supply apparatus 2, the wireless power receiving apparatus 4, and the multiple relay devices 6. Thus, such an arrangement is capable of satisfying the conditions for resonance for the overall operation of the wireless power transmission system 1a.

The multiple automatic tuning assist circuits 100 (200) may be configured to operate with the same switching phase $\varphi_{PX}$.

Alternatively, the multiple automatic tuning assist circuits 100 (200) may each be configured to operate with different phases $\varphi_{PX}$. Such an arrangement allows the amount of the electric power signal S1 (magnetic field) to be controlled for each relay device 6. With such a control operation, in a case in which there are multiple wireless power receiving apparatuses 4, such an arrangement allows the power supply amount to be controlled for each wireless power receiving apparatus 4. Also, such an arrangement allows the directionality of the electric power signal S1 to be controlled.

While the preferred embodiments of the present invention have been described using specific terms, such description is for illustrative purposes only, and it is to be understood that changes and variations may be made without departing from the spirit or scope of the appended claims.

What is claimed is:

1. A relay device employed in a resonance wireless power transmission system, wherein the resonance wireless power transmission system includes a wireless power supply apparatus having a transmission antenna structured to transmit a power signal and a wireless power receiving apparatus having a receiving antenna structured to receive the power signal, and a degree of coupling between the transmission antenna and the receiving antenna changes with time, and wherein the relay device is separately positioned from the wireless power supply apparatus and the wireless power receiving apparatus respectively, and the relay device functions to relay power between the transmitting antenna and the receiving antenna, the relay device comprising:
a relay antenna comprising a power relay coil; and
an automatic tuning assist circuit coupled with the relay antenna,
wherein the automatic tuning assist circuit comprises:
a first terminal and a second terminal coupled with the relay antenna;
N (N represents an integer) auxiliary capacitors;
a plurality of switches each of which is arranged between two terminals from among the first terminal, the second terminal, and the terminals of the aforementioned N auxiliary capacitors; and
a controller configured to switch on and off the plurality of switches in synchronization with an electric power signal transmitted from a wireless power supply apparatus, wherein the plurality of switches includes a first switch and a second switch,
and wherein the N auxiliary capacitors include a first auxiliary capacitor,
and wherein the first switch and the first auxiliary capacitor are arranged in series between the first terminal and the second terminal,
and wherein the second switch is arranged between the first terminal and the second terminal, in parallel with the first switch and the first auxiliary capacitor.

2. The relay device according to claim 1, wherein the controller is configured to switch on and off the plurality of switches with the same frequency as that of the electric power signal transmitted from the wireless power supply apparatus, or otherwise with a frequency obtained by multiplying or otherwise dividing the frequency of the electric power signal by an odd number.

3. The relay device according to claim 1, wherein the N auxiliary capacitors further include a second auxiliary capacitor,
and wherein the second auxiliary capacitor is arranged between the first terminal and the second terminal, in series with the second switch.

4. The relay device according to claim 1, wherein the first switch and the second switch are each configured as a uni-directional switch having an inversely conducting element,
and wherein the controller is configured to switch on and off the first switch and the second switch with a phase such that no current flows through their inversely conducting elements.

5. The relay device according to claim 3, wherein the first switch and the second switch are each configured as a bi-directional switch.

6. The relay device according to claim 1, wherein the relay antenna is coupled in series with the relay antenna via a transformer.

7. The relay device according to claim 1, wherein the relay antenna further comprises a resonance capacitor arranged in series with the power relay coil.

8. A relay device employed in a resonance wireless power transmission system, wherein the resonance wireless power transmission system includes a wireless power supply apparatus having a transmission antenna structured to transmit a power signal and a wireless power receiving apparatus having a receiving antenna structured to receive the power signal, and a degree of coupling between the transmission antenna and the receiving antenna changes with time, and wherein the relay device is separately positioned from the wireless power supply apparatus and the wireless power receiving apparatus respectively, and the relay device functions to relay power between the transmitting antenna and the receiving antenna, the relay device comprising:

a relay antenna comprising a power relay coil; and an automatic tuning assist circuit coupled with the relay antenna;

wherein the automatic tuning assist circuit comprises:

a first terminal and a second terminal coupled with the relay antenna;

N (N represents an integer) auxiliary capacitors;

a plurality of switches each of which is arranged between two terminals from among the first terminal the second terminal and the terminals of the aforementioned N auxiliary capacitors; and a controller configured to switch on and off the plurality of switches in synchronization with an electric power signal transmitted from a wireless power supply apparatus, wherein the plurality of switches includes a first switch, a second switch, a third switch, and a fourth switch, and wherein the N auxiliary capacitors include a first auxiliary capacitor, and wherein the first switch and the second switch are arranged in series between the first terminal and the second terminal, and wherein the third switch and the fourth switch are sequentially arranged in series between the first terminal and the second terminal, forming a path in parallel with the first switch and the second switch, and wherein the first auxiliary capacitor is arranged between a connection node that connects the first switch and the second switch and a connection node that connects the third switch and the fourth switch.

9. The relay device according to claim 8, wherein the first switch through the fourth switch are each configured as a uni-directional switch having an inversely conducting element, and wherein the controller is configured to switch on and off the first switch through the fourth switch with a phase such that no current flows through their inversely conducting elements.

10. The relay device according to claim 8, wherein the first switch through the fourth switch are each configured as a bi-directional switch.

* * * * *